United States Patent
Dohta

(10) Patent No.: US 8,295,648 B2
(45) Date of Patent: Oct. 23, 2012

(54) STORAGE MEDIUM HAVING STORED THEREON IMAGE PROCESSING PROGRAM AND IMAGE PROCESSING APPARATUS

(75) Inventor: Takuhiro Dohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1100 days.

(21) Appl. No.: 11/797,431

(22) Filed: May 3, 2007

(65) Prior Publication Data

US 2008/0226179 A1 Sep. 18, 2008

(30) Foreign Application Priority Data

Mar. 12, 2007 (JP) ................................ 2007-062193

(51) Int. Cl.
*G06K 9/54* (2006.01)
*G06T 15/80* (2011.01)
(52) U.S. Cl. ........ 382/302; 382/264; 382/276; 345/422; 345/592; 345/642
(58) Field of Classification Search .................. 382/302, 382/264, 276; 345/422, 592, 642, 421
See application file for complete search history.

(56) References Cited

U.S. PATENT DOCUMENTS

| | | | |
|---|---|---|---|
| 5,363,475 A * | 11/1994 | Baker et al. ................... | 345/422 |
| 6,409,598 B1 | 6/2002 | Takeuchi ...................... | 463/31 |
| 6,429,877 B1 * | 8/2002 | Stroyan ........................ | 345/611 |
| 6,590,574 B1 * | 7/2003 | Andrews ....................... | 345/419 |
| 6,664,958 B1 * | 12/2003 | Leather et al. ................ | 345/422 |
| 7,206,000 B2 * | 4/2007 | Zitnick et al. ................. | 345/592 |
| 2004/0109004 A1* | 6/2004 | Bastos et al. .................. | 345/587 |
| 2004/0155887 A1 | 8/2004 | Kitsutaka ...................... | 345/582 |

FOREIGN PATENT DOCUMENTS

| | | |
|---|---|---|
| EP | 1 174 829 A2 | 1/2002 |
| JP | 2001-175884 | 6/2001 |

OTHER PUBLICATIONS

Potmesil, et al. "A Lens and Aperture Camera Model for Synthetic Image Generation." International Conference on Computer Graphics and Interactive Techniques. 15.3 (1981): 297-305. Print.*
Mulder, et al. "Fast Perception-Based Depth of Field Rendering." Virtual Reality Software and Technology. (2000): 129-133. Print.*

(Continued)

*Primary Examiner* — Michael A Newman
(74) *Attorney, Agent, or Firm* — Nixon & Vanderhye P.C.

(57) ABSTRACT

A computer of an information processing apparatus sets an α value of each pixel in accordance with a depth value (Z value) of the pixel of a reference image. The α value is set such that a synthesizing ratio of the reference image is higher for a pixel having a depth value closer to a predetermined reference value. Next, the computer increases the α value which is set for a pixel having a smaller α value among two adjacent pixels which have an α value difference of a predetermined value or greater. Then, the computer synthesizes the reference image and a blurred image corresponding to the reference image based on the α value which is set for each pixel after being processed by the increasing processing.

21 Claims, 16 Drawing Sheets

OTHER PUBLICATIONS

Scheuermann, Thorsten. "Advanced Depth of field" Game Developers Conference 2004, 2004, Slides 1-21. <http://developer.amd.com/media/gpu_assets/Scheuermann_DepthOfField.pdf>.*

European Search Report issued in connection with corresponding European Patent Application No. 08004472.0-2218, dated Jul. 2, 2008.

Demers, Joe, "Depth of Field: A Survey of Techniques," XP-002484682, Mar. 22, 2004, pp. 375-390.

Demers, Joe, "Depth of Field in the Toys Demo—Fun With Realtime Post-Processing," XP-002484681 Game Developers Conference 2003, Feb. 22, 2003, Slides 5-9.

* cited by examiner

STORAGE MEDIUM HAVING STORED THEREON IMAGE PROCESSING PROGRAM AND IMAGE PROCESSING APPARATUS

CROSS REFERENCE TO RELATED APPLICATION

The disclosure of Japanese Patent Application No. 2007-062193, filed on Mar. 12, 2007, is incorporated herein by reference.

FIELD

The technology herein relates to a game processing program and an image processing apparatus, and more particularly to a storage medium having stored thereon an image processing program for generating an image focused in accordance with a distance from a viewpoint and an image processing apparatus.

BACKGROUND AND SUMMARY

Conventionally, there is a technology for generating an image of a virtual world focused in accordance with a distance from a viewpoint (depth). The expression "image focused in accordance with a distance from a viewpoint" refers to an image in which an object located closer to the focal point of a virtual camera in the depth direction (viewing direction) is shown with a clear outline and an object located farther from the focal point of the virtual camera in the depth direction is shown with a blurred outline. Such an image can represent the distance of different parts of the image from the viewpoint more realistically.

Patent document 1 (Japanese Laid-Open Patent Publication No. 2001-175884) describes an image generation system for generating an image focused as described above. According to this image generation system, an original image and a blurred image are generated, and a focused image is generated by synthesizing the original image and the blurred image based on an α value which is set for each pixel. The α value is in the range of $0 \leq \alpha \leq 1$, and represents the synthesizing ratio of the original image and the blurred image. In the above-described image generation system, the α value is set in accordance with a depth value of each pixel of the original image. Since the synthesizing ratio (α value) of the original image and the blurred image changes in accordance with the depth value of each pixel, an image focused in accordance with the distance from the viewpoint can be generated.

FIG. 23 shows an exemplary focused image generated by such a conventional method. In FIG. 23, disc-shaped objects 91 through 93 are located in a virtual space. The object 91 is located closest to the viewpoint of the virtual camera, and the object 93 is located farthest from the viewpoint of the virtual camera (at the deepest position of the three objects). In FIG. 23, it is assumed that the focal point of the virtual camera is at the position of the object 92. For the pixels of the object 92 at the focal point, the α value is set to 0. Therefore, the original image is reflected and the object 92 is shown as being well focused (with a clear outline). For the objects 91 and 93 away from the focal point, the α value is set to a value closer to 1. Therefore, the blurred image is reflected to a high degree and the objects 91 and 93 are shown unfocused (with a blurred outline).

According to the method described in patent document 1, the α value is set to 0 for the pixels of the object 92 located at the focal point. For the pixels in the vicinity of a border L between the objects 91 and 92 shown overlapping each other, the α value is set to 0 for the pixels of the object 92 and the original image is reflected. Therefore, as shown in FIG. 23, the object 91 is shown with a clear outline along the border L, although the object 91 would be seen more realistically with a blurred outline along the border L. As a result, the object 91 is shown unnatural.

According to the method of patent document 1, the α value is simply set in accordance with the depth value of each pixel. For this reason, where pixels having significantly different depth values are closely adjacent to each other, the border between the focused pixels and the unfocused pixels are presented clearly. The resultant image appears unnatural.

Therefore, certain example embodiments provide an image processing program and an image processing apparatus for generating a more realistic image.

The reference numerals, additional descriptions and the like in parentheses in this section of the specification indicate the correspondence with the embodiments described later for easier understanding of certain example embodiments, and are not limiting in any way.

A first aspect of certain example embodiments is directed to a computer-readable storage medium having stored thereon an image processing program (game program 60) to be executed by a computer (CPU 10 and/or GPU 11b) of an image processing apparatus (game apparatus 3) for generating an image. The image processing program causes the computer to execute an α value setting step (S4), an increasing step (S5, S6), and a synthesis step (S7). The α value setting step sets an α value (α information) of each pixel of a reference image (FIG. 8) having a depth value (Z value) for each pixel, the α value being set in accordance with the depth value of the respective pixel. The increasing step increases the α value which is set for a pixel having a smaller α value among two adjacent pixels (FIG. 16 or FIG. 21). The synthesis step synthesizes the reference image and a blurred image (FIG. 9) corresponding to the reference image based on the α value which is set for each pixel after being processed by the increasing step.

According to a second aspect of certain example embodiments, the increasing step may be performed only where the two adjacent pixels have an α value difference of a predetermined value or greater.

According to a third aspect of certain example embodiments, in the α value setting step, the computer may set the α value such that a ratio of the reference image is higher for a pixel having a depth value closer to a predetermined reference value.

According to a fourth aspect of certain example embodiments, in the α value setting step, the computer may set a two-dimensional vector for each pixel by setting the α value as a first component value (n component value) of the two-dimensional vector for a pixel having a depth value smaller than the predetermined reference value, and by setting the α value as a second component value (f component value) of the two-dimensional vector for a pixel having a depth value larger than the predetermined reference value (FIG. 14). In this case, the increasing step comprises a smoothing step (S5) and an addition step (S6). The smoothing step smoothes a value of the first component of the two-dimensional vector which is set for each pixel. The addition step sets a sum of the first component value and the second component value of the two-dimensional vector as the α value for each pixel. In the synthesis step, the computer synthesizes the reference image and the blurred image based on the α value which is set for each pixel after being processed with the addition step.

According to a fifth aspect of certain example embodiments, in the α value setting step, the computer may set 0 as the second component value of the two-dimensional vector for a pixel having a depth value smaller than the predetermined reference value, and may set 0 as the first component value of the two-dimensional vector for a pixel having a depth value larger than the predetermined reference value.

According to a sixth aspect of certain example embodiments, in the increasing step, the computer may process only the pixels having a depth value which is equal to or smaller than a predetermined value.

According to a seventh aspect of certain example embodiments, in the increasing step, the computer may smooth the α value of each pixel.

According to an eighth aspect of certain example embodiments, in the increasing step, the computer may select a pixel having an α value which is smaller than the α value of an adjacent pixel and is different from the α value of the adjacent pixel by a predetermined value or greater, and may increase the α value of the selected pixel.

According to a ninth aspect of certain example embodiments, in the increasing step, the computer may select a pixel having an α value which is smaller than the α value of an adjacent pixel and is equal to or smaller than a predetermined value, and may increase the α value of the selected pixel.

According to a tenth aspect of certain example embodiments, the image processing program may cause the computer to further execute a blurred image generation step (S3) of generating the blurred image by smoothing a color value of each pixel of the reference image.

An eleventh aspect of certain example embodiments is directed to a computer-readable storage medium having stored thereon an image processing program (game program 60) to be executed by a computer (CPU 10 and/or GPU 11b) of an image processing apparatus (game apparatus 3) for generating an image. The image processing program causes the computer to execute a depth value correction step (S11), an α value setting step (S12), and a synthesis step (S7). The depth value correction step corrects a pixel having a depth value closer to a predetermined reference value among two adjacent pixels of a reference image (FIG. 8) having a depth value for each pixel, the pixel being corrected such that the depth value thereof becomes closer to the depth value of the other pixel. The α value setting step sets an α value of each pixel in accordance with the depth value of the respective pixel after being processed by the depth value correction step. The synthesis step synthesizes the reference image and a blurred image corresponding to the reference image based on the α value which is set for each pixel.

According to a twelfth aspect of certain example embodiments, the depth value correction step may be performed only where the two adjacent pixels have a depth value difference of a predetermined value or greater.

According to a thirteenth aspect of certain example embodiments, in the α value setting step, the computer may set the α value such that as a ratio of the reference image is higher for a pixel having a depth value closer to the predetermined reference value.

According to a fourteenth aspect of certain example embodiments, the depth value correction step may be performed on only the pixels having a depth value which is equal to or smaller than the predetermined value.

Certain example embodiments may be provided in the form of an image processing apparatus having the equivalent functions of an image processing apparatus for executing the steps in the first through fourteenth aspects.

According to the first aspect, for a pixel having a smaller α value among two adjacent pixels which have an α value difference of a predetermined value or greater, the α value which is set for the pixel is increased in accordance with the depth value. Thus, an image can be generated with the outline of a border portion between the two pixels being blurred. Therefore, an unnatural image in which only a part of the outline of an object is clear is prevented from being generated, and a more realistic image can be generated.

According to the second aspect, the α value correction (increase) is performed only when the α value difference is a predetermined value or greater. Thus, the pixels which need to be corrected can be corrected with certainty.

According to the third aspect, an object corresponding to a pixel having a depth value closer to a reference value is shown with a clear outline, whereas an object corresponding to a pixel having a depth value farther from the reference value is shown with a blurred outline. Thus, an image with realistic focusing can be generated.

According to the fourth aspect, the α value correction (increase) is performed at least on a pixel having a depth value smaller than the reference value. Therefore, the problem of the conventional technology that the border between a focused object and an unfocused object is clearly presented is solved.

According to the fifth aspect, the α value correction (increase) is performed only on a pixel having a depth value smaller than the reference value. A pixel having a depth value larger than the reference value is not a target of correction. Therefore, an image, in which the border between a focused object and an object located closer to the viewpoint than the focused object is blurred and the border between the focused object and an object located farther from the viewpoint than the focused object is clear (FIG. 10), is generated. Thus, an image with more realistic focusing can be generated.

According to the sixth aspect, the α value correction (increase) is performed only on a pixel having a depth value smaller than the reference value. A pixel having a depth value larger than the reference value is not a target of correction. Therefore, by setting the reference value to, for example, a predetermined value, an image, in which the border between a focused object and an object located closer to the viewpoint than the focused object is blurred and the border between the focused object and an object located farther from the viewpoint than the focused object is clear (FIG. 10), is generated. Thus, an image with more realistic focusing can be generated.

According to the seventh aspect, smoothing is performed on the α value of each pixel. Thus, for a pixel, the α value of which is to be increased (i.e., for a pixel having a smaller α value among two adjacent pixels which have an α value difference of a predetermined value or greater), the α value can be easily increased.

According to the eighth aspect, a pixel having an α value which is smaller than the α value of an adjacent pixel and is different from the α value of the adjacent pixel by a predetermined value or greater is selected. Thus, the pixel, the α value of which is to be increased, can be specified with certainty. Therefore, an image with realistic focusing can be generated without fail.

According to the ninth aspect, a pixel having an α value which is smaller than the α value of an adjacent pixel and is a predetermined value or smaller is selected. Thus, the pixel, the α value of which is to be increased, can be specified with certainty. Therefore, an image with realistic focusing can be generated without fail.

According to the tenth aspect, a blurred image can be easily generated from the reference image.

According to the eleventh aspect, for a pixel having a depth value closer to a predetermined reference value among two adjacent pixels which have a depth value difference of a predetermined value or greater, the depth α value is corrected so as to be closer to the depth value of the other pixel. The α value is set in accordance with the post-correction depth value. Therefore, substantially the same effect as that of the first aspect of correcting the α value is provided. Namely, an image can be generated with the outline of the border between the two pixels being blurred. Thus, a more realistic image can be generated.

According to the twelfth aspect, the depth value is corrected only when the depth value difference between two adjacent pixels is a predetermined value or greater. Thus, the pixels which need to be corrected can be corrected with certainty.

According to the thirteenth aspect, an object corresponding to a pixel having a depth value closer to a reference value is shown with a clear outline, whereas an object corresponding to a pixel having a depth value farther from the reference value is shown with a blurred outline. Thus, an image with realistic focusing can be generated.

According to the fourteenth aspect, the depth value correction is performed only on a pixel having a depth value smaller than the reference value. A pixel having a depth value larger than the reference value is not a target of correction. Therefore, by setting the reference value to, for example, a predetermined value, an image, in which the border between a focused object and an object located closer to the viewpoint than the focused object is blurred and the border between the focused object and an object located farther from the viewpoint than the focused object is clear (FIG. 10), is generated. Thus, an image with more realistic focusing can be generated.

These and other objects, features, aspects and advantages of certain example embodiments will become more apparent from the following detailed description of certain example embodiments when taken in conjunction with the accompanying drawings.

DETAILED DESCRIPTION (Overall Structure of the Game System)

Figure 1:
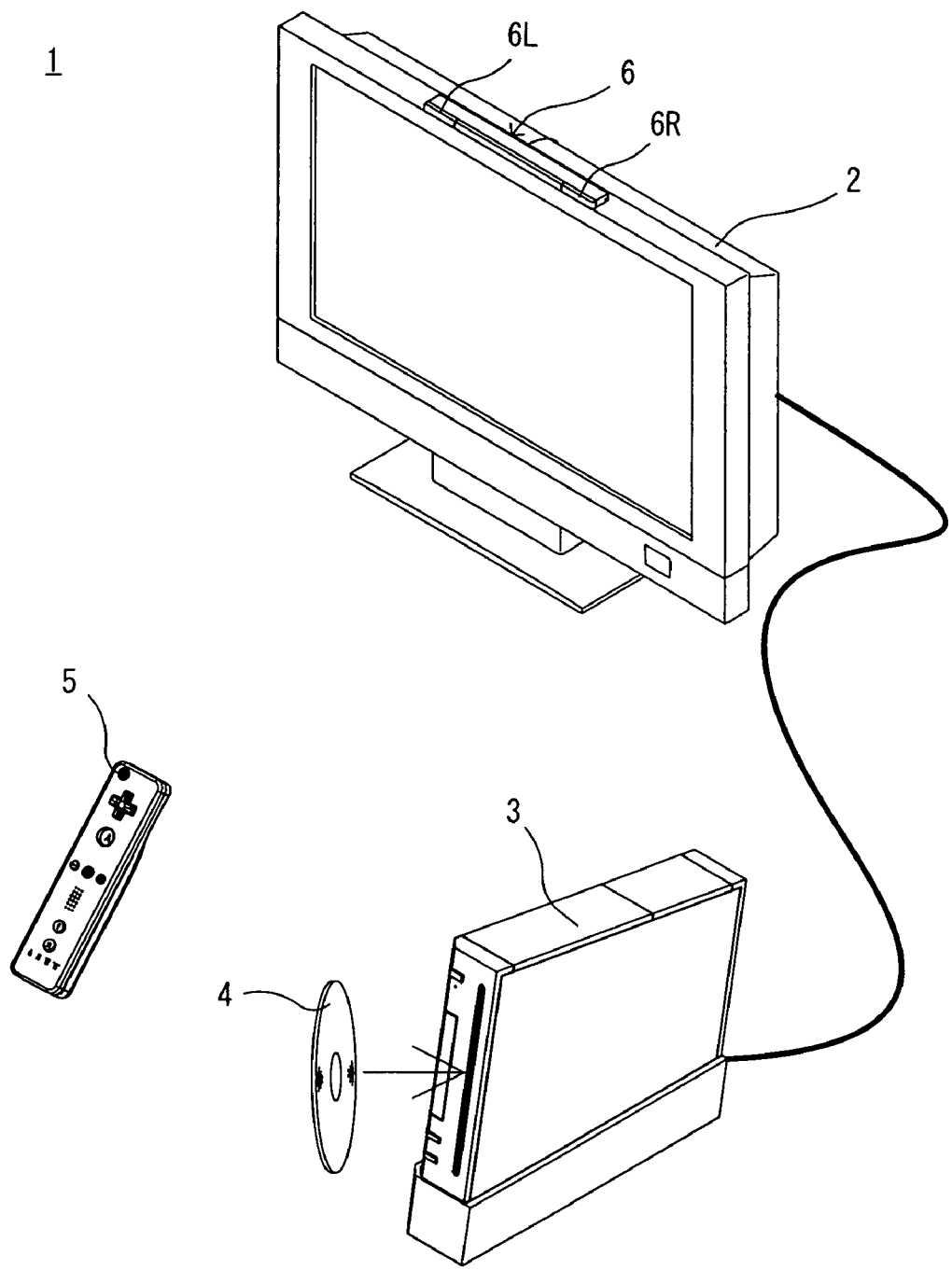
FIG. 1 is an external view of a game system 1.

With reference to FIG. 1, a game system 1 including a game apparatus 3 according to an embodiment will be described. FIG. 1 is an external view of the game system 1. Hereinafter, a game apparatus and a game program according to this embodiment will be described. In the following example, the game apparatus 3 is of an installation type. As shown in FIG. 1, the game system 1 includes a TV receiver 2 (hereinafter, referred to simply as a "TV") 2, the game apparatus 3, an optical disc 4, a controller 5, and a marker section 6. In the game system 1, game processing is executed by the game apparatus 3 based on a game operation performed using the controller 5.

On the game apparatus 3 as an exemplary image processing apparatus according to certain example embodiments, the optical disc 4 is detachably mountable as an exemplary information storage medium exchangeably usable for the game apparatus 3. The optical disc 4 has stored thereon a game program to be executed by the game apparatus 3. The game apparatus 3 has an insertion opening for mounting the optical disc 4 on a front surface thereof. The game apparatus 3 reads and executes the game program stored on the optical disc 4 inserted into the insertion opening, and thus performs the game processing.

The game apparatus 3 is connected to the TV 2 as an exemplary display device via a connection cord. The TV 2 displays a game image obtained as a result of the game processing executed by the game apparatus 3. The marker section 6 is provided in the vicinity of a display screen of the TV 2 (above the display screen in FIG. 1). The marker section 6 includes two markers 6R and 6L respectively at two ends thereof. Specifically, the marker 6R (also the marker 6L) includes one or more infrared LEDs, and outputs infrared light forward from the TV 2. The marker section 6 is connected to the game apparatus 3, and the game apparatus 3 can control each of the infrared LEDs to be lit up or out.

The controller 5 is an input device for providing the game apparatus 3 with operation data representing the particulars of the operation made thereon. The controller 5 and the game apparatus 3 are connected with each other via wireless communication. In this embodiment, the controller 5 and the game apparatus 3 are communicable to each other by, for example, the Bluetooth (registered trademark) technology. In other embodiments, the controller 5 and the game apparatus 3 may be connected with each other in a wired manner.

(Internal Structure of the Game Apparatus 3)

Figure 2:
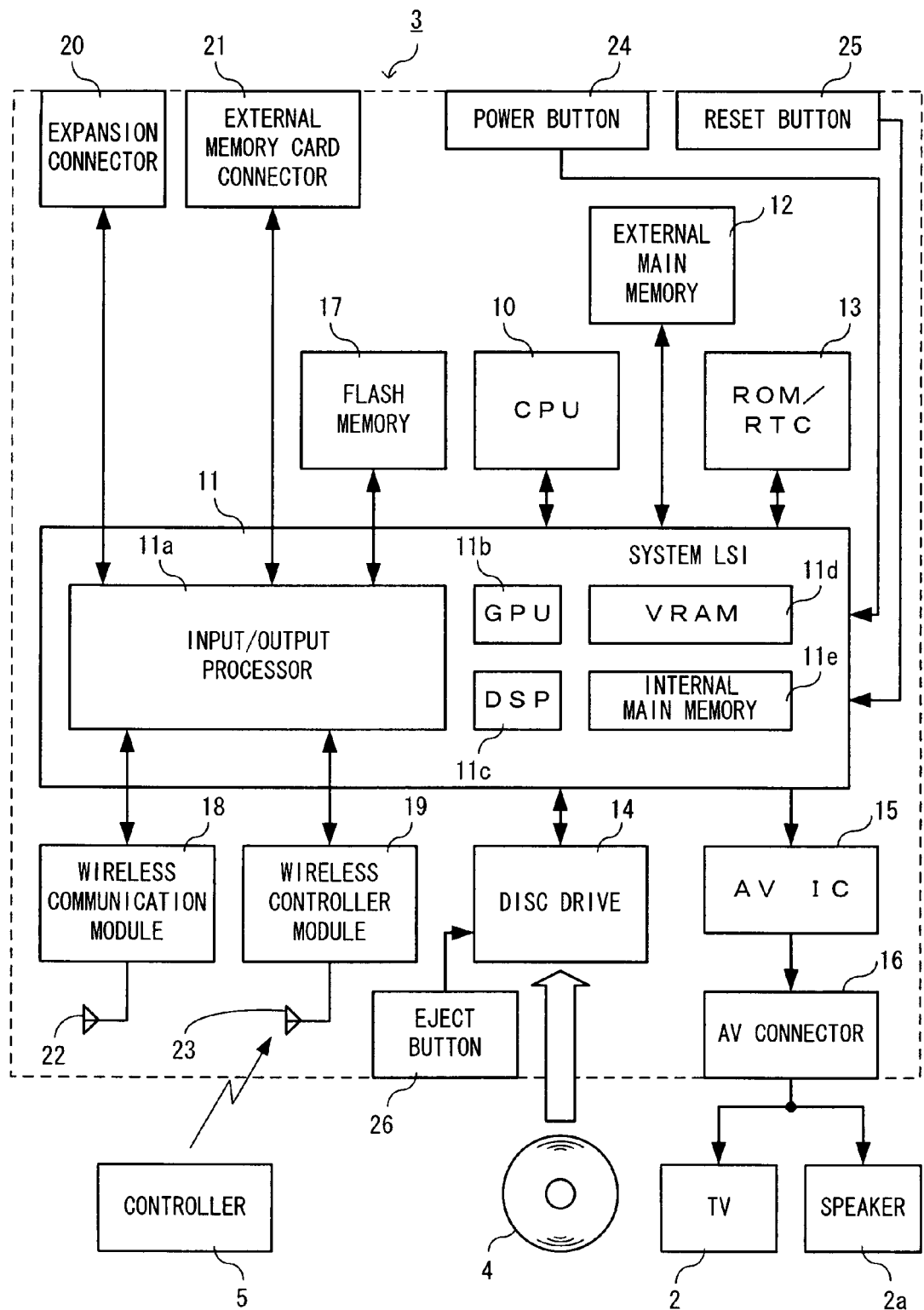
FIG. 2 is a functional block diagram of a game apparatus 3.

Next, with reference to FIG. 2, an internal structure of the game apparatus 3 will be described. FIG. 2 is a block diagram showing a structure of the game apparatus 3. The game apparatus 3 includes a CPU 10, a system LSI 11, an external main memory 12, a ROM/RTC 13, a disc drive 14, an AV-IC 15, and the like.

The CPU 10 performs the game processing by executing a game program stored on the optical disc 4, and acts as a game processor. The CPU 10 is connected to the system LSI 11. The system LSI 11 is connected to the CPU 10 and also to the external main memory 12, the ROM/RTC 13, the disc drive 14 and the AV-IC 15. The system LSI 11, for example, controls data transfer between the elements connected thereto, generates images to be displayed, and obtains data from external devices. An internal structure of the system LSI 11 will be described later. The external main memory 12, which is of a volatile type, has stored thereon programs including a game program read from the optical disc 4, a game program read from a flash memory 17, or various other data. The external main memory 12 is used as a work area or a buffer area of the CPU 10. The ROM/RTC 13 includes a ROM having a program for starting the game apparatus 3 incorporated thereon (so-called boot ROM) and a clock circuit for counting time (RTC: Real Time Clock). The disc drive 14 reads program data, texture data or the like from the optical disc 4 and writes the read data onto an internal main memory 11e or the external main memory 12.

The system LSI 11 includes an input/output processor (I/O processor) 11a, a GPU (Graphics Processor Unit) 11b, a DSP (Digital Signal Processor) 11c, a VRAM 11d, and the internal main memory 11e. Although not shown, these elements 11a through 11e are connected with each other via an internal bus.

The GPU 11b is a part of drawing means and generates an image in accordance with a graphics command (a command to draw an image) from the CPU 10. The VRAM 11d stores data necessary for the GPU 11b to execute the graphics command (polygon data, texture data or other data). The GPU 11b uses the data stored on the VRAM 11d to generate an image.

The DSP 11c acts as an audio processor and generates audio data using sound data or sound wave (sound tone) data stored on the internal main memory 11e or the external main memory 12.

The image data and the audio data generated as described above are read by the AV-IC 15. The AV-IC 15 outputs the read image data to the TV 2 via an AV connector 16, and outputs the read audio data to a speaker 2a built in the TV 2. Thus, the image is displayed on the TV 2 and also the sound is output from the speaker 2a.

The input/output processor (I/O processor) 11a transmits or receives data to or from the elements connected thereto, or downloads data from external devices. The input/output processor 11a is connected to the flash memory 17, a wireless communication module 18, a wireless controller module 19, an expansion connector 20, and an external memory card connector 21. The wireless communication module 18 is connected to an antenna 22, and the wireless controller module 19 is connected to an antenna 23.

The input/output processor 11a is connected to a network via the wireless communication module 18 and the antenna 22, and thus can communicate with other game apparatuses or various servers also connected to the network. The input/output processor 11a periodically accesses the flash memory 17, and detects whether or not there is data which needs to be transmitted to the network. When there is such data, the input/output processor 11a transmits such data to the network via the wireless communication module 18 and the antenna 22. The input/output processor 11a also receives data transmitted from other game apparatuses or data downloaded from a download server via the network, the antenna 22 and the wireless communication module 18, and stores the received data on the flash memory 17. The CPU 10 executes the game program and thus reads the data stored on the flash memory 17 to be used for the game program. The flash memory 17 may have stored therein data saved as a result of playing the game using the game apparatus 3 (data after or in the middle of the game) as well as the data to be transmitted to, or data received from, the other game apparatuses or various servers.

The input/output processor 11a receives operation data which is transmitted from the controller 5 via the antenna 23 and the wireless controller module 19 and stores the operation data in a buffer area of the internal main memory 11e or the external main memory 12 (temporary storage).

The input/output processor 11a is connected to the expansion connector 20 and the external memory card connector 21. The expansion connector 20 is a connector for an interface such as USB, SCSI or the like. The expansion connector 20 may be connected to a medium such as an external storage medium or the like, may be connected to a peripheral device such as another controller or the like, or may be connected to a wired communication connector, to communicate with the network instead of the wireless communication module 18. The external memory card connector 21 is a connector for an external storage medium such as a memory card or the like. For example, the input/output processor 11a can access an external storage medium via the expansion connector 20 or the external memory card connector 21 to store or read data.

The game apparatus 3 has a power button 24, a reset button 25, and an eject button 26. The power button 24 and the reset button 25 are connected to the system LSI 11. When the power button 24 is turned on, the elements of the game apparatus 3 are provided with power via an AC adaptor (not shown). When the reset button 25 is pressed, the system LSI 11 restarts a starting program of the game apparatus 3. The eject button 26 is connected to the disc drive 14. When the eject button 26 is pressed, the optical disc 4 is dismounted from the disc drive 14.

(Structure of the Controller 5)

Figure 3:
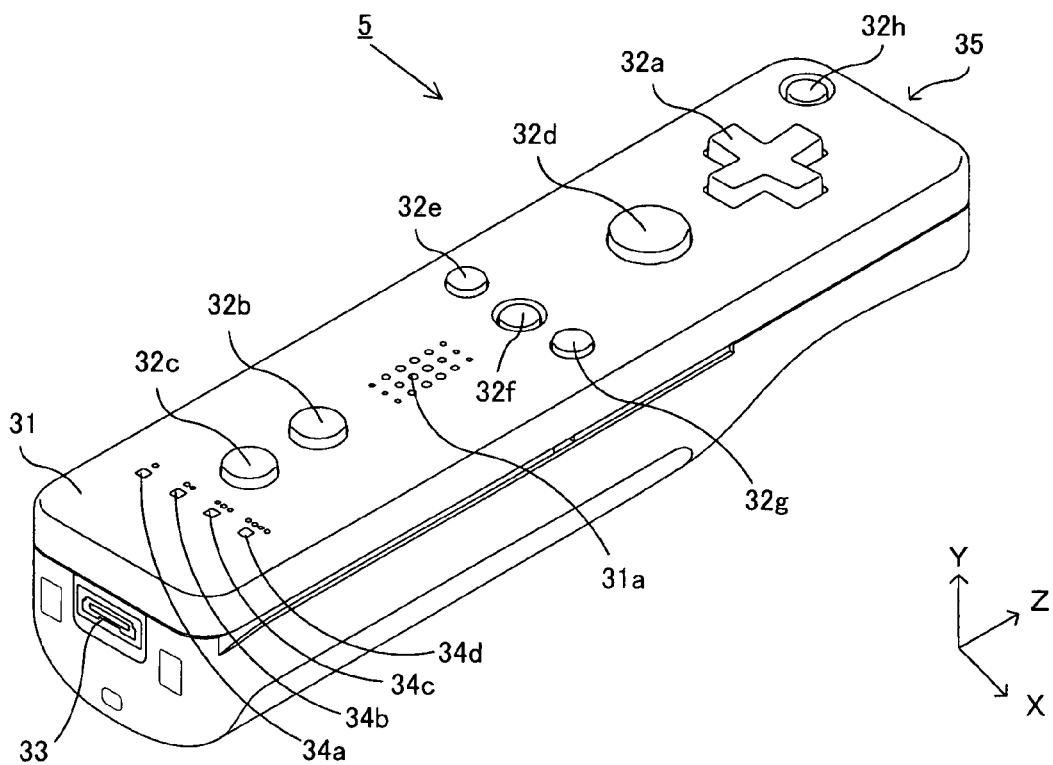
FIG. 3 is an isometric view showing an external appearance of a controller 5.
Figure 4:
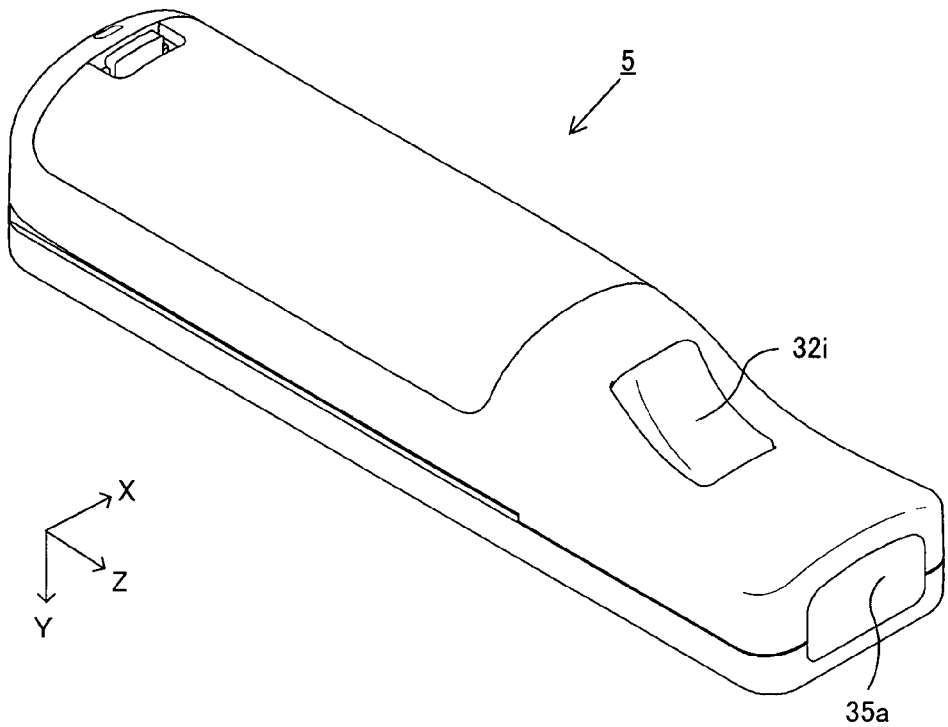
FIG. 4 is an isometric view showing an external appearance of a controller 5.

With reference to FIG. 3 through FIG. 6, the controller 5 will be described. FIG. 3 and FIG. 4 are external isometric views of the controller 5. FIG. 3 is an isometric view of the controller 5 seen from the top rear side thereof. FIG. 4 is an isometric view of the controller 5 seen from the bottom front side thereof.

As shown in FIG. 3 and FIG. 4, the controller 5 includes a housing 31 formed by plastic molding or the like. The housing 31 has a generally parallelepiped shape extending in a longitudinal or front-rear direction (Z-axis direction shown in FIG. 3). The overall size of the housing 31 is small enough to be held by one hand of an adult or even a child. A player can perform a game operation by, for example, pressing buttons provided in the controller 5 or moving the controller 5 itself to change the position or posture thereof.

The housing 31 has a plurality of operation buttons. As shown in FIG. 3, provided on a top surface of the housing 31 are a cross key 32a, a first button 32b, a second button 32c, an A button 32d, a minus button 32e, a home button 32f, a plus button 32g, and a power button 32h. As shown in FIG. 4, a recessed portion is formed on a bottom surface of the housing 31, and a B button 32i is provided on a slope surface of the recessed portion. The operation buttons 32a through 32i are assigned various functions in accordance with the game program executed by the game apparatus 3. The power button is for remote-controlling the power of the main body of the game apparatus 3 to be on or off. The home button 32f and the power button 32h have a top surface thereof buried in the top surface of the housing 31, so as not to be inadvertently pressed by the player.

On a rear surface of the housing 31, a connector 33 is provided. The connector 33 is used for connecting the controller 5 with another device (for example, another controller).

In a rear part of the top surface of the housing 31, a plurality of LEDs (in FIG. 3, four LEDs 34a through 34d) are provided. The controller 5 is assigned a controller type (number) so as to be distinguishable from the other controllers 5. The LEDs 34 are used for, for example, informing the player of the controller type which is currently set to controller 5 that he/she is using, or for informing the player of the remaining battery amount. Specifically, when the controller 5 is used for the game operation, one of the plurality of LEDs 34a through 34d corresponding to the controller type is lit up.

Figure 5A:
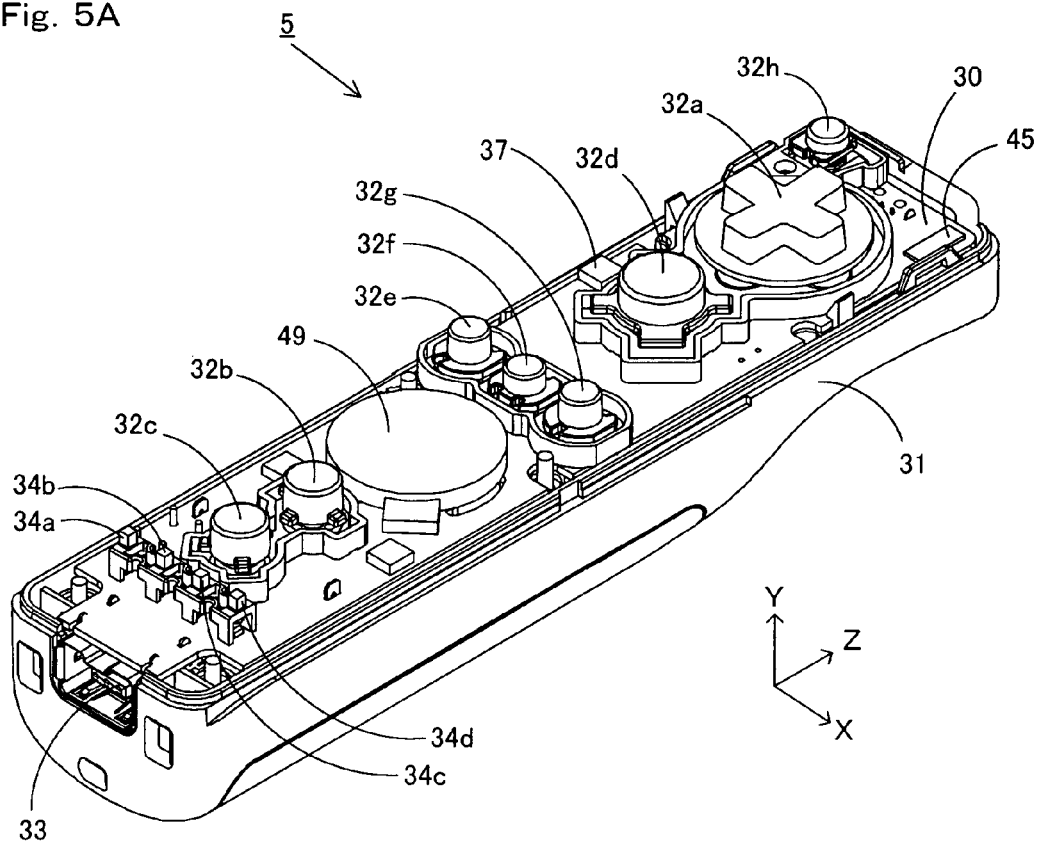
FIG. 5A shows an internal structure of the controller 5.
Figure 5B:
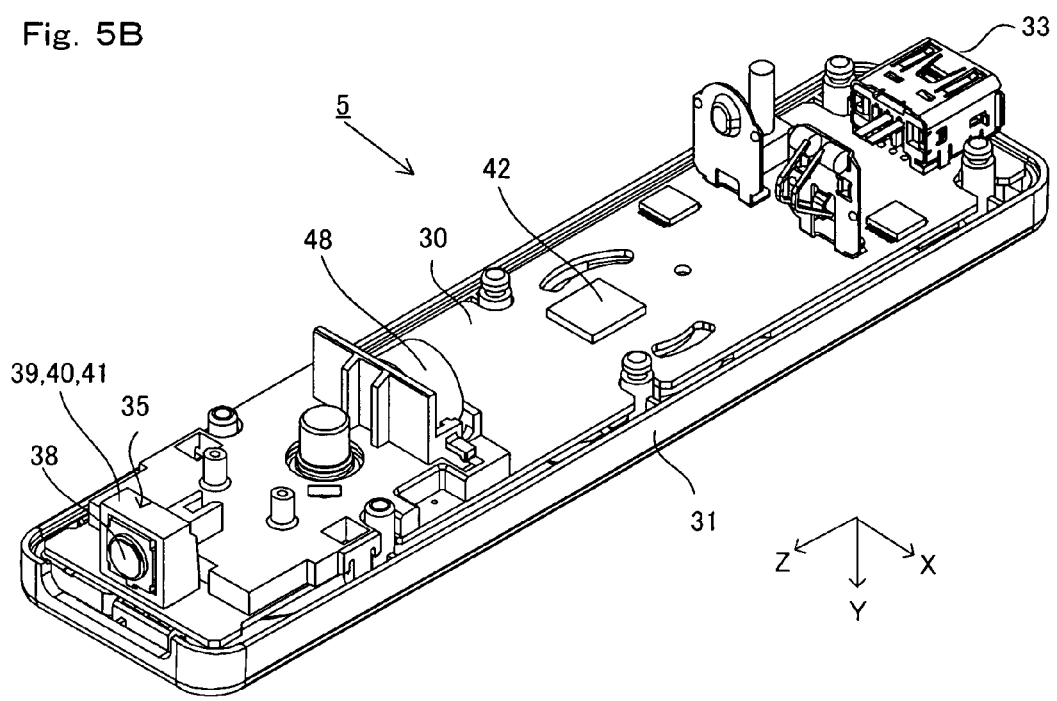
FIG. 5B shows an internal structure of the controller 5.

The controller 5 includes an imaging information calculation section 35 (FIG. 5B). As shown in FIG. 4, a light incident face 35a of the imaging information calculation section 35 is provided on a front surface of the housing 31. The light incident face 35a is formed of a material which allows infrared light from the markers 6R and 6L to be at least transmitted therethrough.

On the top surface of the housing 31, sound holes 31a are formed between the first button 32b and the home button 32f for releasing the sound outside from a speaker 49 (FIG. 5A) built in the controller 5.

With reference to FIG. 5A and FIG. 5B, an internal structure of the controller 5 will be described. FIG. 5A and FIG. 5B illustrate an internal structure of the controller 5. FIG. 5A is an isometric view illustrating a state where an upper casing (a part of the housing 31) of the controller 5 is removed. FIG. 5B is an isometric view illustrating a state where a lower casing (a part of the housing 31) of the controller 5 is removed. FIG. 5B shows a reverse side of a substrate 30 shown in FIG. 5A.

As shown in FIG. 5A, the substrate 30 is fixed inside the housing 31. On a top main surface of the substrate 30, the operation buttons 32a through 32h, the LEDs 34a through 34d, an acceleration sensor 37, an antenna 45, the speaker 49 and the like are provided. These elements are connected to a microcomputer 42 (see FIG. 5B) via lines (not shown) formed on the substrate 30 and the like. In this embodiment, the acceleration sensor 37 is provided off the center line of the controller 5 along an X-axis direction. This makes it easier to calculate the motion of the controller 5 when the controller 5 is rotated around the Z axis as the rotation center. The acceleration sensor 37 is also located forward with respect to the center of the controller 5 along the longitudinal direction thereof (Z-axis direction). The provision of a wireless module 44 (FIG. 6) and the antenna 45 allow the controller 5 to act as a wireless controller.

As shown in FIG. 5B, at a front edge of a bottom main surface of the substrate 30, the imaging information calculation section 35 is provided. The imaging information calculation section 35 includes an infrared filter 38, a lens 39, an imaging element 40 and an image processing circuit 41 located in this order from the front surface of the controller 5. These elements 38 through 41 are attached to the bottom main surface of the substrate 30.

On the bottom main surface of the substrate 30, the microcomputer 42 and a vibrator 48 are provided. The vibrator 48 may be, for example, a vibration motor or a solenoid, and is connected to the microcomputer 42 via lines provided on the substrate 30 and the like. The controller 5 is vibrated by an actuation of the vibrator 48 based on an instruction from the microcomputer 42, and the vibration is conveyed to the hand of the player holding the controller 5. Thus, a so-called vibration-responsive game is realized. In this embodiment, the vibrator 48 is slightly forward with respect to the center of the housing 31. Since the vibrator 48 is provided closer to a front end than the center of the controller 5, the vibration of the vibrator 48 can vibrate the entire controller 5 more significantly. The connector 33 is attached at a rear edge of the main bottom surface of the substrate 30. In addition to the elements shown in FIG. 5A and FIG. 5B, the controller 5 includes a quartz oscillator for generating a reference clock of the microcomputer, an amplifier for outputting an audio signal to the speaker 49, and the like.

The shape of the controller 5, the shape of the operation buttons, and the number, position or the like of the acceleration sensor and the vibrator shown in FIG. 3 through FIG. 5B are merely exemplary, and may be altered without departing from the scope of the present invention. In this embodiment, the imaging direction of the imaging means is in the Z-axis direction, but the imaging direction may be any direction. Specifically, the position of the imaging information calculation section 35 (the light incident face 35a of the imaging information calculation section 35) in the controller 5 does not need to be on the front surface of the housing 31, and may be on another surface as long as light can enter from the outside of the housing 31.

Figure 6:
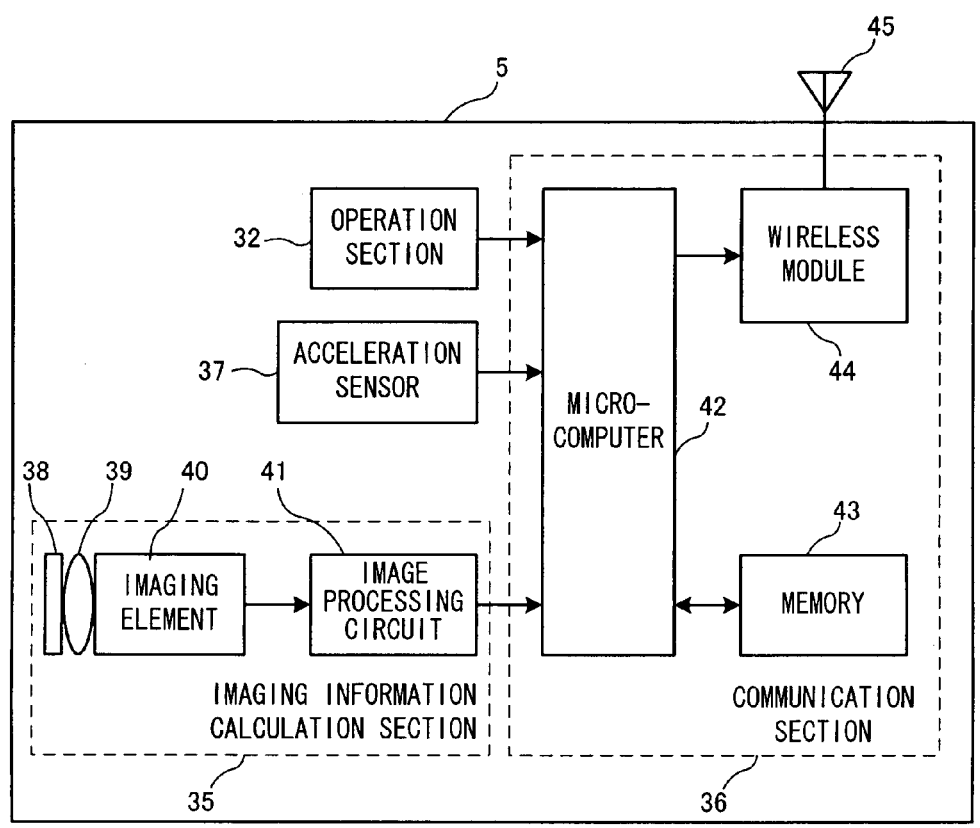
FIG. 6 is a block diagram showing a structure of the controller 5.

FIG. 6 is a block diagram showing a structure of the controller 5. The controller 5 includes the operation section 32 (operation buttons 32a through 32i), the connector 33, the imaging information calculation section 35, a communication section 36, and the acceleration sensor 37. The controller 5 transmits operation data representing the particulars of the operation made thereon to the game apparatus 3 as operation data.

The operation section 32 includes the above-described operation buttons 32a through 32i, and outputs data representing an input state of each of the operation buttons 32a through 32i (whether each of the operation buttons 32a through 32i has been pressed or not) to the microcomputer 42 of the communication section 36.

The imaging information calculation section 35 is a system for analyzing image data taken by the imaging means, distinguishing an area having a high brightness in the image data, and calculating the center of gravity, the size and the like of the area. The imaging information calculation section 35 has, for example, a maximum sampling period of about 200 frames/sec., and therefore can trace and analyze even a relatively fast motion of the controller 5.

The imaging information calculation section 35 includes the infrared filter 38, the lens 39, the imaging element 40 and the image processing circuit 41. The infrared filter 38 allows only infrared light to pass therethrough, among light incident on the front surface of the controller 5. The lens 39 collects the infrared light which has been transmitted through the infrared filter 38 and causes the infrared light to be incident on the imaging element 40. The imaging element 40 is a solid-state imaging device such as, for example, a CMOS sensor or a CCD sensor. The imaging element 40 receives the infrared light collected by the lens 39 and outputs an image signal. The markers 6R and 6L of the marker section 6 located in the vicinity of the screen of the TV 2 each include an infrared LED for outputting infrared light forward from the TV 2. The provision of the infrared filter 38 allows the imaging element 40 to receive only the infrared light transmitted through the infrared filter 38 to generate image data. Therefore, the image of each of the markers 6R and 6L can be taken more accurately. Hereinafter, an image taken by the imaging element 40 will be referred to as a "taken image". The image data generated by the imaging element 40 is processed by the image processing circuit 41. The image processing circuit 41 calculates the positions of imaging targets (the markers 6R and 6L)

in the taken image. The image processing circuit 41 outputs a coordinate representing the calculated position to the microcomputer 42 of the communication section 36. The data on the coordinate is transmitted to the game apparatus 3 from the microcomputer 42 as operation data. Hereinafter, this coordinate will be referred to as a "marker coordinate". The marker coordinate changes in accordance with the direction (posture) or the position of the controller 5 itself, and therefore the game apparatus 3 can calculate the direction or the position of the controller 5 using the marker coordinate.

The acceleration sensor 37 detects an acceleration (including a gravitational acceleration) of the controller 5. Namely, the acceleration sensor 37 detects a force (including the force of gravity) applied to the controller 5. The acceleration sensor 37 detects a value of the acceleration in a linear direction along a sensing axis (linear acceleration) among the accelerations acting on a detection section of the acceleration sensor 37. For example, in the case of a multi-axial (at least two-axial) acceleration sensor, an acceleration of a component along each axis is detected as an acceleration acting on the detection section of the acceleration sensor. For example, a three-axial or two-axial acceleration sensor 37 may be available from Analog Devices, Inc. or STMicroelectronics N.V. The acceleration sensor 37 is, for example, an electrostatic capacitance type, but may be of any other system.

In this embodiment, the acceleration sensor 37 detects a linear acceleration in each of an up-down direction with respect to the controller 5 (Y-axis direction shown in FIG. 3), a left-right direction with respect to the controller 5 (X-axis direction shown in FIG. 3), and a front-rear direction with respect to the controller 5 (Z-axis direction shown in FIG. 3). Since the acceleration sensor 37 detects an acceleration in the linear direction along each axis, the output from the acceleration sensor 37 represents a value of the linear acceleration along each of the three axes. Namely, the detected acceleration is represented as a three-dimensional vector in an x-y-z coordinate system which is set with respect to the controller 5.

Data representing the acceleration detected by the acceleration sensor 37 (acceleration data) is output to the communication section 36. Since the acceleration detected by the acceleration sensor 37 changes in accordance with the direction (posture) or the motion of the controller 5 itself, the game apparatus 3 can calculate the direction or the motion of the controller 5 using the acceleration data. Namely, the game apparatus 3 calculates the posture or the motion of the controller 5 based on the acceleration data and the marker coordinate data described above.

The communication section 36 includes the microcomputer 42, a memory 43, the wireless module 44 and the antenna 45. The microcomputer 42 controls the wireless module 44 for wirelessly transmitting the data obtained by the microcomputer 42 to the game apparatus 3 while using the memory 43 as a storage area during processing.

Data which is output from the operation section 32, the imaging information calculation section 35, and the acceleration sensor 37 to the microcomputer 42 is temporarily stored on the memory 43. Such data is transmitted to the game apparatus 3 as the operation data. Namely, at the transmission timing to the wireless controller module 19, the microcomputer 42 outputs the operation data stored on the memory 43 to the wireless module 44. The wireless module 44 modulates a carrier wave of a predetermined frequency with the operation data and radiates the resultant very weak radio signal from the antenna 45, using, for example, the Bluetooth (registered trademark) technology. Namely, the operation data is modulated into a very weak radio signal by the wireless module 44 and transmitted from the controller 5. The very weak radio signal is received by the wireless controller module 19 on the side of the game apparatus 3. The received very weak radio signal is demodulated or decoded, so that the game apparatus 3 can obtain the operation data. The CPU 10 of the game apparatus 3 executes the game processing based on the obtained operation data and the game program. The wireless communication from the communication section 36 to the wireless controller module 19 is performed at a predetermined cycle. Since game processing is generally performed at a cycle of 1/60 sec. (at a cycle of frame time), the wireless transmission is preferably performed at a cycle of a shorter time period. The communication section 36 of the controller 5 outputs the operation data to the wireless controller module 19 of the game apparatus 3 at rate of, for example, once in 1/200 seconds.

Figure 7:
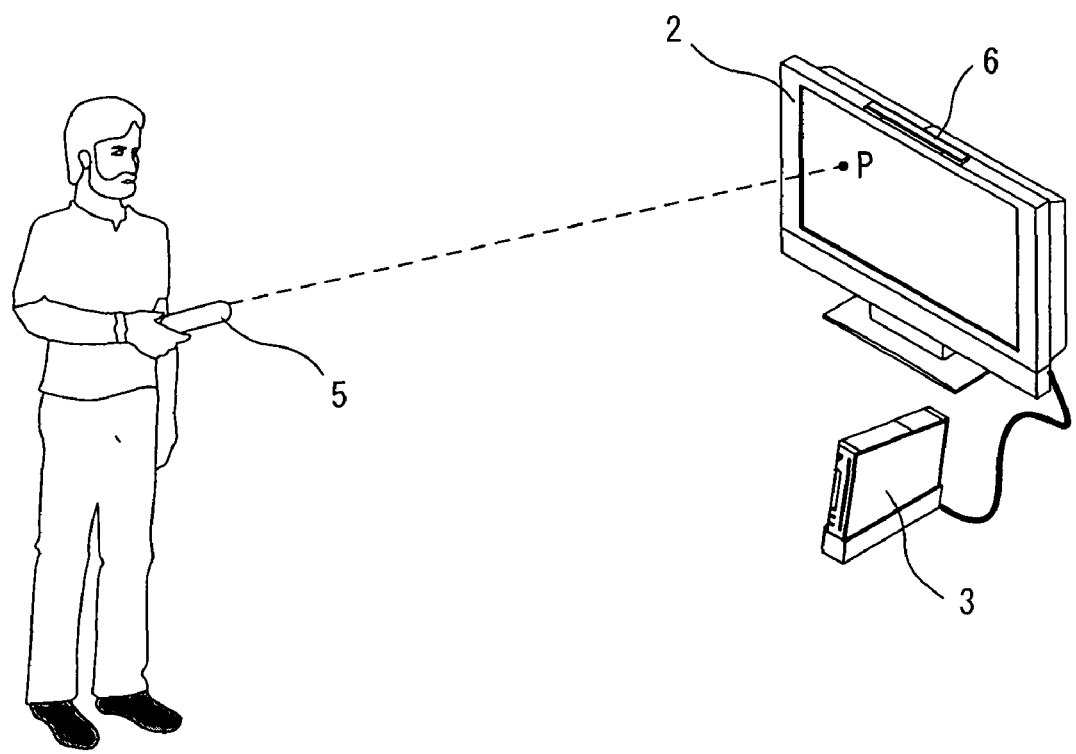
FIG. 7 shows how the controller 5 is used to perform a game operation.

By using the controller 5, the player can perform an operation of instructing an arbitrary position on the screen using the controller 5 or moving the controller 5 itself, in addition to a conventional general game operation of pressing the operation buttons. FIG. 7 shows how the controller 5 is used to perform a game operation. In this embodiment, as shown in FIG. 7, the player can perform a game operation of designating position P on the screen of the TV 2 by the controller 5 or a game operation of moving the controller 5.

In this embodiment, the game apparatus 3 uses the controller 5 as an input device. The information processing apparatus according to certain example embodiments is not limited to such a game apparatus, and may be any apparatus capable of generating an image in a virtual world and displaying such an image on a display device connected thereto. The input device may be anything, for example, a keyboard or a mouse, and the information processing apparatus may not include an input device.

(Overview of Image Generation Processing)

Hereinafter, with reference to FIG. 8 through FIG. 10, an overview of the image generation processing in this embodiment will be described. In this embodiment, the game apparatus 3 generates a focused image of a three-dimensional virtual space. In this embodiment, a focused image is generated by a method of preparing an image with a clear outline (reference image; also referred to as an original image) and an image obtained by blurring the outline of the reference image (blurred image) and then synthesizing the reference image and the blurred image.

Figure 8:
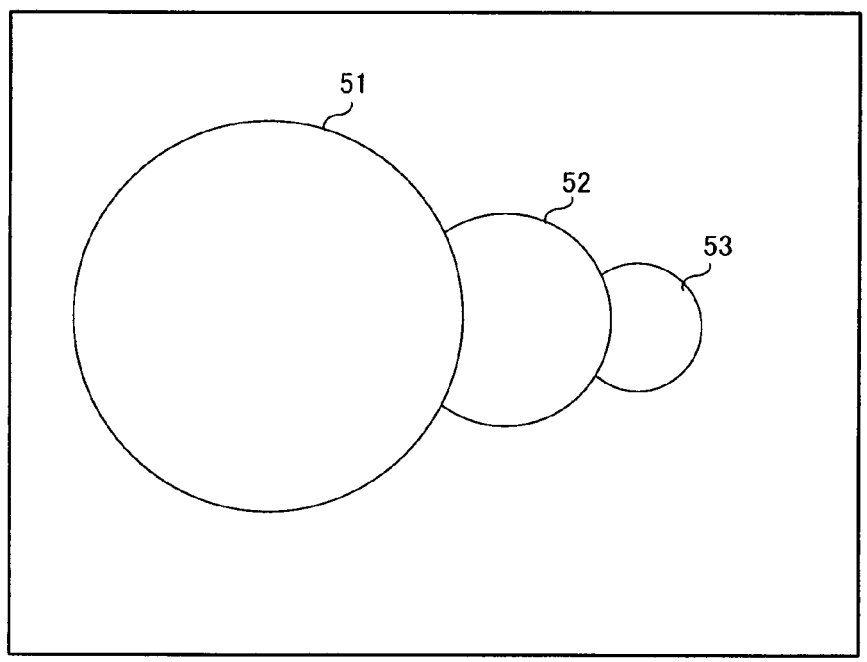
FIG. 8 shows an exemplary reference image.
Figure 9:
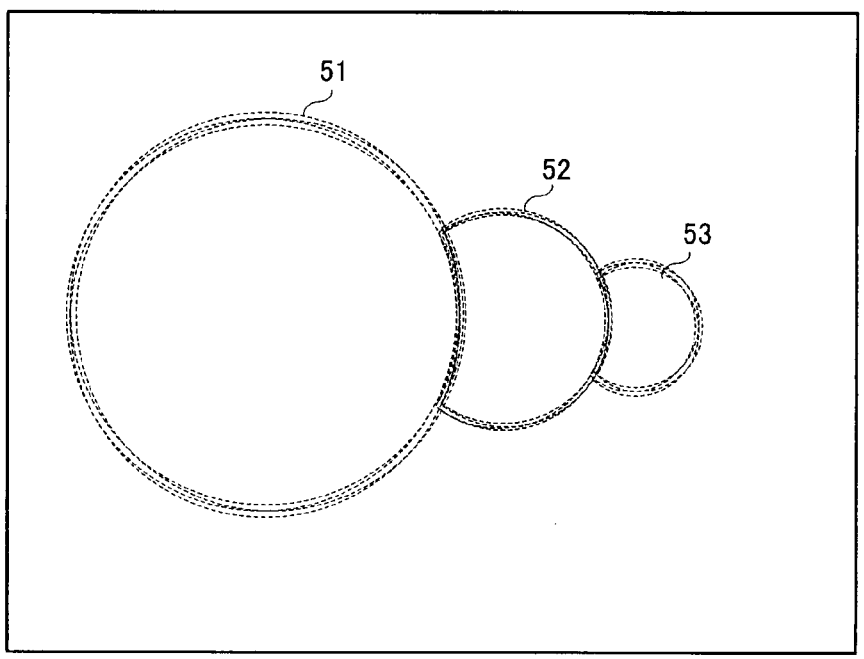
FIG. 9 shows an exemplary blurred image.

FIG. 8 shows an exemplary reference image, and FIG. 9 shows an exemplary blurred image. In the following example, a focused image of a three-dimensional virtual space in which three disc-shaped objects 51 through 53 are located will be generated. Among the three objects 51 through 53, a first object 51 is located closest to the viewpoint of a virtual camera, a third object 53 is located farthest from the viewpoint (at the deepest position), and a second object 52 is located between the first object 51 and the third object 53. In the following example, the focal point of the virtual camera is at the second object 52.

The reference image is obtained by performing perspective transformation of a three-dimensional virtual space based on the position of the virtual camera. As shown in FIG. 8, in the reference image, the objects 51 through 53 are shown with clear outlines. By contrast, as shown in FIG. 9, in the blurred image, the objects 51 through 53 are shown with blurred outlines. In FIG. 9, the outlines of the objects 51 through 53 are represented with a plurality of dotted lines in order to show that the outlines are blurred. A blurred image is typically generated by performing well-known blurring processing on a reference image. Blurring processing is, for example, to smooth a color value of each color (RGB values) of the reference image by using an average value of adjacent pixels or using a Gauss filter. The blurring processing may be to first enlarge each object of the reference image and then reduce each such object (rough the outline). A blurred image may also be generated by performing bilinear filtering or trilinear filtering on the reference image.

The game apparatus 3 generates a reference image and a blurred image, and also sets an α value for each pixel of the reference image. The α value represents the ratio of the blurred image with respect to a post-synthesis image obtained by synthesizing the blurred image and the reference image (also referred to as a "blending ratio"). Specifically, the α value is in the range of $0 \leq \alpha \leq 1$. When α=0, the ratio of the blurred image in the post-synthesis image is 0% (the ratio of the reference image is 100%). When α=1, the ratio of the blurred image in the post-synthesis image is 100% (see expression (7) described later).

In this embodiment, the α value is provisionally set in accordance with the depth value (i.e., Z value) of each pixel. Specifically, for a pixel having a Z value equal to the distance from the viewpoint to the focal point of the virtual camera (herein, such a distance will be referred to as a "focal length"), α is set as α=0. For the other pixels, the α value is set to be larger as the difference between the Z value and the focal length is larger. By synthesizing the reference image and the blurred image using such α values, an image, in which an object having a depth closer to the focal length is shown with a clearer outline and an object having a depth farther from the focal length is shown with a blurred outline, can be generated. In other words, an image, in which an object having a depth closer to the focal length is more focused and an object having a depth farther from the focal length is more unfocused, can be generated.

Figure 23:
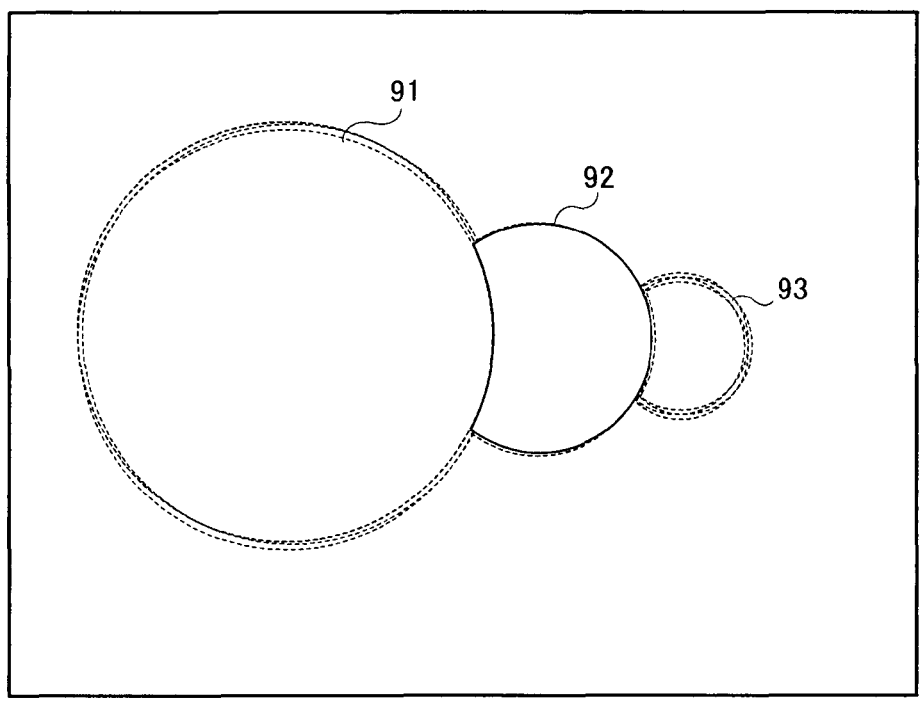
FIG. 23 shows an exemplary focused image generated by a conventional method.

However, when the synthesis is performed using the α values which are set in accordance with the Z values of the respective pixels as they are, as shown in FIG. 23, the border between a focused object and an unfocused object is clearly shown. In other words, even an unfocused object is shown with a clearly outlined border. The resultant image is not realistic. In this embodiment, the α values provisionally set in accordance with the Z values of the respective pixels are subjected to correction processing described later (step S5 in FIG. 12). The correction processing increases an α value, which is set to be small, of a pixel in the vicinity of the border. In this embodiment, α values corrected in this manner are used to synthesize the reference image and the blurred image (α blending) to generate an image with proper focusing. In such an image, the unfocused object is shown with a border having a blurred outline.

Figure 10:
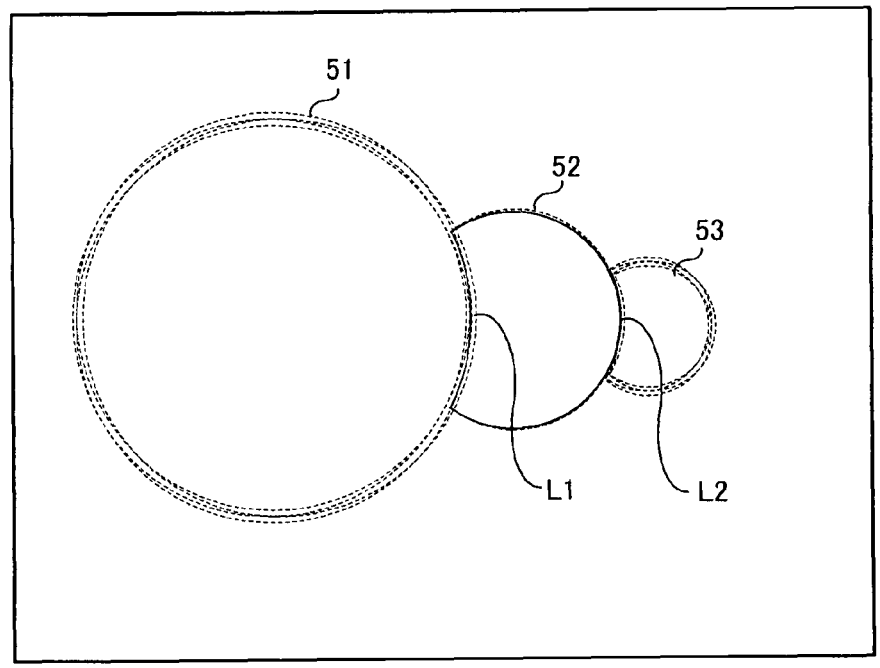
FIG. 10 shows an exemplary image generated by image generation processing according to an embodiment.

FIG. 10 shows an exemplary image generated by the image generation processing in this embodiment. In the image shown in FIG. 10, the outline of the first object 51 is blurred in the vicinity of a border L1 between the object 51 and the second object 52. Therefore, the outline of the first object 51 is entirely blurred. As understood from this, in this embodiment, the unnaturalness of the image in FIG. 23 that only a part of the outline of a blurred object is clearly shown is solved. As described later in detail, in this embodiment, the correction processing is performed on a border L2 between the focused second object 52 and the unfocused third object 53, such that the blurred outline of the third object 53 does not overlap the image of the second object 52. Whereas the blurred outline of the first object 51 located closer to the viewpoint of the virtual camera than the focused second object 52 overlaps the image of second object 52, the blurred outline of the third object 53 located farther from the viewpoint of the virtual camera than the focused second object 52 does not overlap the image of second object 52. As a result, the image can be generated with more realistic focusing.

(Details of the Image Generation Processing)

Figure 11:
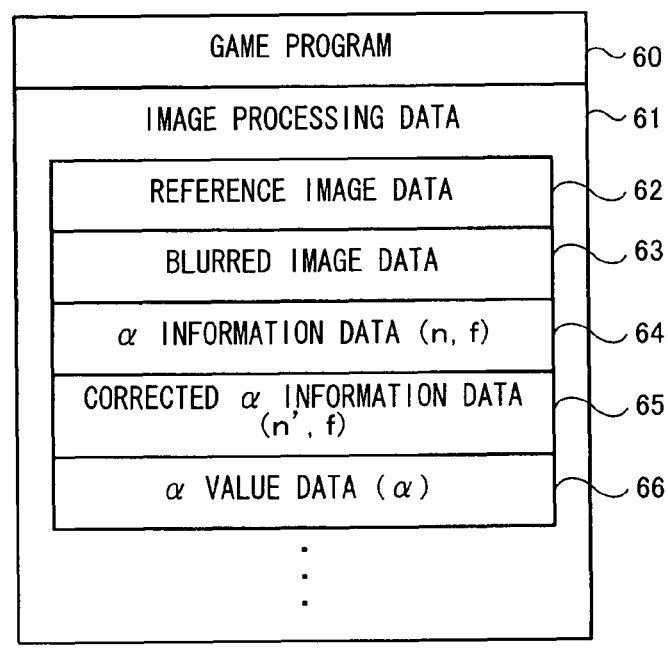
FIG. 11 shows main data stored on a main memory in the game apparatus 3.

Hereinafter, with reference to FIG. 11 through FIG. 18, the image generation processing in this embodiment will be described in detail. FIG. 11 shows main data stored on the main memory of the game apparatus 3 (the external main memory 12 or the internal main memory 11e). As shown in FIG. 11, the main memory stores thereon a game program 60, image processing data 61 and the like. In addition to the data shown in FIG. 11, the main memory also stores image data on various objects appearing in the game, data representing various parameters of the objects, and other data necessary for the game.

The game program 60 is an exemplary image processing program according to this embodiment. At an appropriate timing after the power of the game apparatus 3 is turned on, the game program 60 is partially or entirely read onto the main memory from the optical disc 4. The game program 60 includes a program for causing the CPU 10 to execute the image generation processing shown in FIG. 12 and also programs to cause the CPU 10 to execute predetermined processing.

The image processing data 61 is data used in the image generation processing (FIG. 12) described later. The image processing data 61 includes reference image data 62, blurred image data 63, α information data 64, corrected α information data 65, and α value data 66.

The reference image data 62 represents the reference image described above. Specifically, the reference image data 62 represents a color value and a Z value of each pixel of the reference image. The blurred image data 63 represents the blurred image described above. Specifically, the blurred image data 63 represents a color value of each pixel of the blurred image. The reference image data 62 and the blurred image data 63 may be stored on a frame buffer included in the VRAM 11d.

The α information data 64 represents α information which is set for each pixel of the reference image. The α information represents an α value provisionally set for calculating a final α value. In this embodiment, the α information is represented by a two-dimensional vector. Specifically, such a two-dimensional vector includes an n component and an f component, and is represented as (n, f). As described later in detail, in this embodiment, an α value is set for either the n component or the f component depending on whether the Z value of the respective pixel is larger or smaller than the focal length, and "0" is set for the other component. The corrected α information represents α information obtained by correcting the α information represented by the α information data 64 by the correction processing. The correction processing will be described later in detail.

The α value data 66 represents an α value set for each pixel. The α value is calculated based on the α information represented by the corrected α information data 65.

Figure 12:
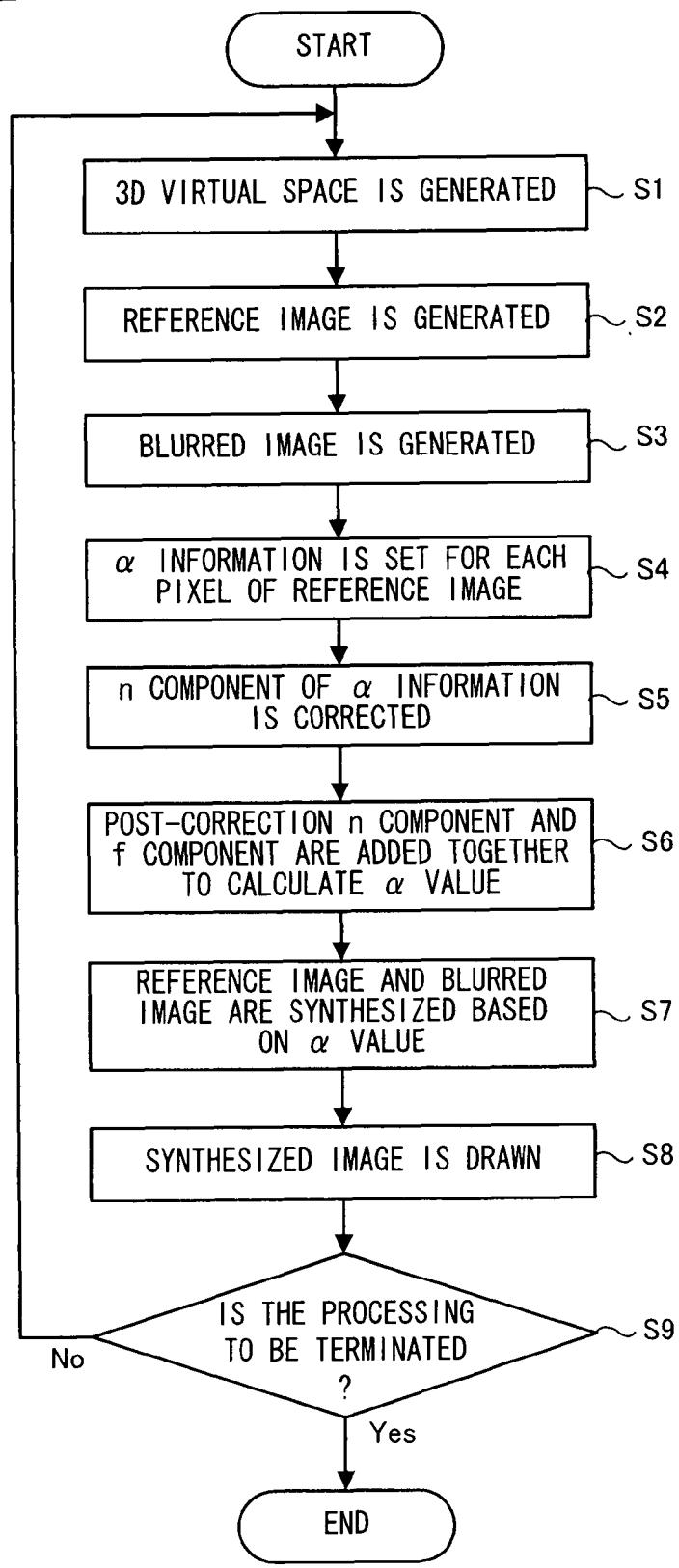
FIG. 12 is a main flowchart illustrating a flow of processing executed by the game apparatus 3.

Now, with reference to FIG. 12 through FIG. 18, the image generation processing executed by the game apparatus 3 will be described in detail. FIG. 12 is a main flowchart illustrating a flow of processing executed by the game apparatus 3. When the power of the game apparatus 3 is turned on and the optical disc 4 having the game program stored thereon is inserted into the game apparatus 3, the CPU 10 of the game apparatus 3 executes a starting program stored on the boot ROM (not shown) to initialize various units including the main memory. The game program stored on the optical disc 4 is read onto the main memory, and the CPU 10 starts the execution of the game program. The flowchart shown in FIG. 12 shows the processing executed after the above-described processing is completed. The processing shown in FIG. 12 is performed cooperatively by the CPU 10 and the GPU 11b.

Referring to FIG. 1, in step S1, the CPU 10 performs various settings for a three-dimensional virtual space. Specifically, objects (objects 51 through 53) are located in the virtual space, and the position and the direction of the virtual camera are set. When the CPU 10 executes the game processing, the position of the objects and the position and the direction of the virtual camera are determined in accordance with the game operation performed by a player using the controller 5.

In step S2, the CPU 10 generates a reference image in accordance with the settings performed in step S1. The reference image is generated by executing perspective transformation such that an image representing the virtual space seen from the position of, and in the direction of, the virtual camera is generated. Namely, a color value and a Z value of each pixel of such an image are calculated. Data representing the reference image generated in step S2 (i.e., data representing the color value and the Z value of each pixel of the reference image) is stored on the main memory as the reference image data 62.

In step S3, the CPU 10 generates a blurred image from the reference image. In this embodiment, the blurred image is generated by smoothing the color value of each pixel of the reference image represented by the reference image data 62 stored on the main memory. Hereinafter, with reference to FIG. 13, a method for generating the blurred image will be described in detail.

Figures 13, 14:
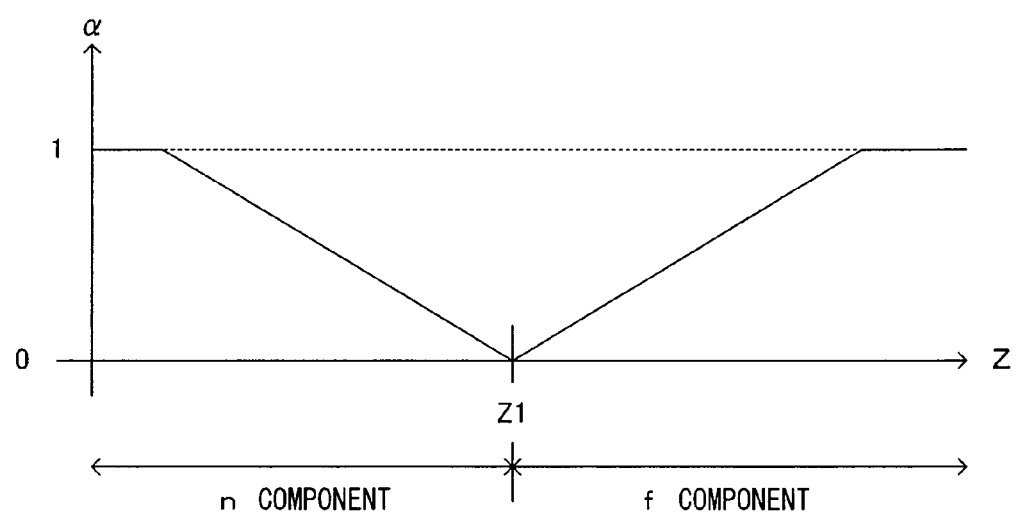
FIG. 13 shows a part of pixels of a reference image.
FIG. 14 shows the relationship between the Z value of a pixel and a information set for the pixel.

FIG. 13 shows a part of the pixels of the reference image. Hereinafter, the color value of pixel X (X is either one of A through M) in the reference image is represented as "PX", and a color value of pixel X in the blurred image is represented as "PX'". For example, the color value of pixel A in the blurred image, i.e., PA', is calculated as an average of the color value of pixel A, i.e., PA, and the color values of four pixels B through E adjacent to pixel A, i.e., PB through PE. Specifically, the CPU 10 calculates the color value PA' in accordance with the following expression (1).

$$PA' = (PA+PB+PC+PD+PE)/5 \quad (1)$$

The CPU 10 executes the processing represented by expression (1) for each pixel of the reference image, so that the color value of each of the pixel of the blurred image is obtained. The resultant data representing the blurred image (i.e., data representing the color value of each pixel of the blurred image) is stored on the main memory as the blurred image data 63.

In other embodiments, expression (1) may be replaced with expression (2), (3) or (4).

$$PA' = (PA+PF+PG+PH+PI)/5 \quad (2)$$

$$PA' = (PA+PB+PC+PD+PE+PF+PG+PH+PI)/9 \quad (3)$$

$$PA' = (PA+PB+PC+PD+PE+PJ+PK+PL+PM)/9 \quad (4)$$

Expression (2) represents that the color value of pixel A, which is a processing target, of the blurred image is obtained as an average of the color value PA of pixel A of the reference image and the color values PF through PI of pixels F through I which are two pixels away from pixel A in the up, down, right and left directions of the reference image. When expression (2) is used, the resultant image is more blurred than when expression (1) is used. Expression (3) represents the color value of pixel A (processing target) of the blurred image is obtained as an average of the color value PA of pixel A of the reference image and the color values PB through PI of pixels B through I which are located within two pixels from pixel A in the up, down, right and left directions of the reference image. When expression (3) is used, the resultant image is more blurred than when expression (1) is used. Expression (4) represents the color value of pixel A (processing target) of the blurred image is obtained as an average of the color value PA of pixel A of the reference image and the color values PB through PE and PJ through PM of pixels B through E and J through M which are located within one pixel from pixel A in the up, down, right, left, and four oblique (upper right, upper left, lower right and lower left) directions of the reference image. When expression (4) is used, the resultant image is more uniformly blurred than when expression (1) is used.

As described above, any method is usable to generate a blurred image. The CPU 10 may generate a blurred image by smoothing the color values of the reference image using a Gauss filter, by once enlarging and then reducing the reference image and thus roughening the outline thereof; or by performing bilinear filtering or trilinear filtering on the reference image.

Returning to FIG. 12, in step S4 after step S3, the CPU 10 sets α information for each pixel of the reference image. The α information of each pixel is determined in accordance with the depth of the object corresponding to the pixel, i.e., the Z value set for the pixel. Hereinafter, with reference to FIG. 14, a method for setting the α information will be described in detail.

FIG. 14 shows the relationship between the Z value of each pixel and the α information set for the pixel. In FIG. 14, the horizontal axis represents the Z value, and the vertical axis represents the α information. In step S4, the CPU 10 first calculates an α value in accordance with the Z value. As shown in FIG. 14, when the Z value is equal to a focal length Z1, the α value is set as α=0. As the difference between the Z value and the focal length Z1 is larger, the α value is set to be larger with the maximum value being α=1. In the example of FIG. 14, the difference and the α value are in proportion to each other. Certain example embodiments are not limited to this, and the difference and the α value may have any other relationship in which as the difference is larger, the α value is larger. The focal length Z1 may be predetermined, designated by the player, or automatically calculated in accordance with a predetermined algorithm.

Upon calculating the α value, the CPU 10 determines whether the α value is set for the n component or the f component based on whether the Z value is larger or smaller than the focal length Z1. Specifically, when the Z value is smaller than the focal length Z1, the α value is set for the n component. Namely, a two-dimensional vector in which the value of the n component is the α value and the value of the f component is 0 is calculated. When the Z value is larger than the focal length Z1, the α value is set for the f component. Namely, a two-dimensional vector in which the value of the n component is 0 and the value of the f component is the α value is calculated. In other words, for the pixels of the object located closer to the viewpoint of the virtual camera than the focal length, a two-dimensional vector of (α, 0) (α represents the α value) is set; whereas for the pixels of the object located farther from the viewpoint of the virtual camera than the focal length, a two-dimensional vector of (0, α) is set. When the Z value is equal to the focal length Z1, a two-dimensional vector of (0, 0) is set. In this embodiment, a two-dimensional vector calculated in this manner is the α information. Data representing the α information of each pixel is stored on the main memory as the α information data 64.

Returning to FIG. 12, in step S5 after step S4, the CPU 10 corrects the n component of the α information set for each pixel. In this embodiment, the correction processing is executed by smoothing the value of the n component of each pixel (hereinafter, referred to as an "n component value"). With reference to FIG. 13, the correction processing will be described in detail. Hereinafter, the pre-correction n component value of pixel X (X is either one of A through M) shown in FIG. 13 is represented as "αX", and the post-correction n component value thereof is represented as "αX'". For example, the post-n component value of pixel A, i.e., αA', is obtained by first obtaining an average of the pre-correction n component value of pixel A, i.e., αA, and the pre-correction n component values of pixels B through E adjacent to pixel A, i.e., αB through αE, and then multiplying the average by a predetermined value (G). Specifically, the CPU 10 calculates the post-correction n component value αA' in accordance with the following expression (5).

$$\alpha A' = (\alpha A + \alpha B + \alpha C + \alpha D + \alpha E)/5 \times G \quad (5)$$

In expression (5), G is a constant, and is preferably set to equal to or greater than 1. The CPU 10 executes the processing represented by expression (5) on the α information set for each pixel of the reference image. The resultant data representing the post-α information of each pixel is stored on the main memory as the corrected α information data 65.

In other embodiments, expression (5) may be replaced with expression (6), (7) or (8).

$$\alpha A' = (\alpha A + \alpha F + \alpha G + \alpha H + \alpha I)/5 \times G \quad (6)$$

$$\alpha A' = (\alpha A + \alpha B + \alpha C + \alpha D + \alpha E + \alpha F + \alpha G + \alpha H + \alpha I)/9 \times G \quad (7)$$

$$\alpha A' = (\alpha A + \alpha B + \alpha C + \alpha D + \alpha E + \alpha J + \alpha K + \alpha L + \alpha M)/9 \times G \quad (8)$$

When expression (6) is used, the post-n component value αA' of pixel A, which is a processing target, is obtained by first obtaining an average of the pre-correction n component value αA of pixel A and the pre-correction n component values αF through αI of pixels F through I which are two pixels away from pixel A in the up, down, right and left directions, and then multiplying the average by the predetermined value (G). When expression (7) is used, the post-n component value αA' of pixel A (processing target) is obtained by first obtaining an average of the pre-correction n component value αA of pixel A and the pre-correction n component values αB through αI of pixels B through I which are located within two pixels from pixel A in the up, down, right and left directions, and then multiplying the average by the predetermined value (G). When expression (8) is used, the post-n component value αA' of pixel A (processing target) is obtained by first obtaining an average of the pre-correction n component value αA of pixel A and the pre-correction n component values αB through αE and αJ through αM of pixels B through E and J through M which are located within one pixel from pixel A in the up, down, right, left, and four oblique (upper right, upper left, lower right and lower left) directions, and then multiplying the average by the predetermined value (G). The averaging of the n component values may be performed using a Gauss filter or using bilinear filtering or trilinear filtering.

Figure 15:
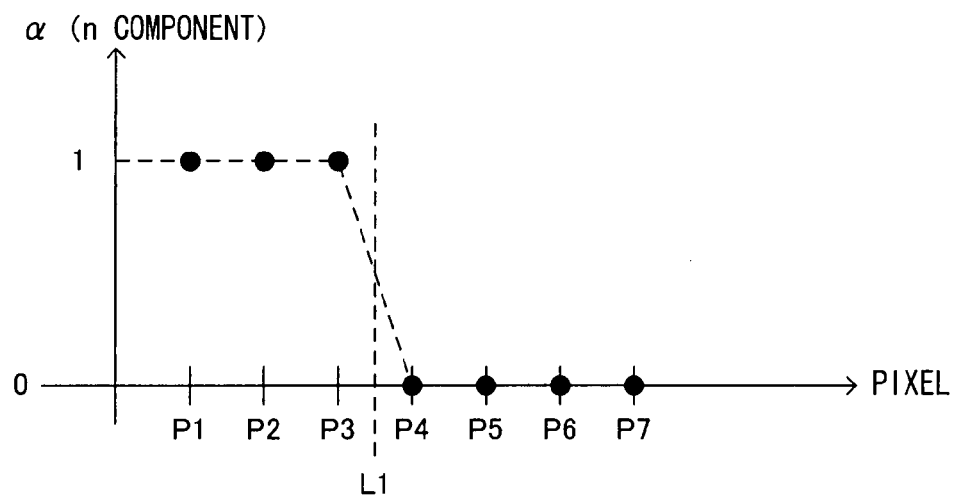
FIG. 15 shows n component values of pixels arranged in one line before correction processing is performed.
Figure 16:
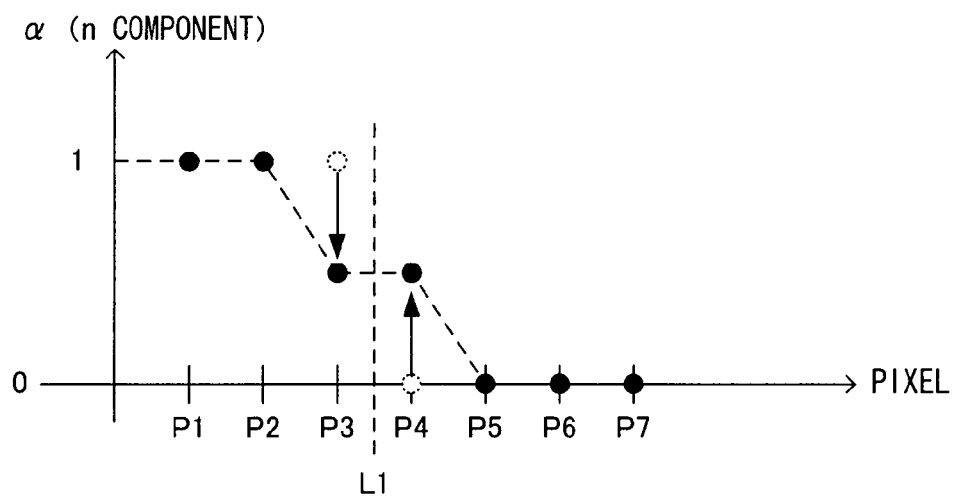
FIG. 16 shows n component values of the pixels arranged in one line after the correction processing is performed.

Hereinafter, with reference to FIG. 15 through FIG. 18, a change in the α information in the correction processing in step S5 will be described. FIG. 15 shows n component values set for pixels arranged in one line before the correction processing. FIG. 16 shows n component values set for the pixels arranged in one line after the correction processing. In FIG. 15 and FIG. 16, the horizontal axis represents pixels P1 through P7 arranged in one line, and the vertical axis represents the n component values at pixels P1 through P7. Pixel P1 through P3 correspond to the first object 51 in FIG. 8, and pixels P4 through P7 correspond to the second object 52 in FIG. 8. The border L1 between the first object 51 and the second object 52 is between pixels P3 and P4. In this example, as a result of the processing in step S4, the n component values of pixels P1 through P3 are set to "1" and the n component values of pixels P4 through P7 are set to "0".

When the correction processing in step S5 is performed on pixels P1 through P7 shown in FIG. 15, the n component values of pixels P1 through P7 are changed to those shown in FIG. 16. FIG. 16 shows the n component values obtained as a result of the correction (smoothing) processing performed using expression (5). As shown in FIG. 16, the n component value of pixel P4, which is adjacent to pixel P3 having the n component of 1 before the correction processing, is changed from 0 before the correction processing to a positive value as a result of the smoothing processing. In this manner, for a pixel having a smaller n component value (α value) than that of an adjacent pixel before the correction processing, the n component value is increased by the correction processing.

The range of the pixels, the n component of which is increased by the correction processing, varies depending on the particulars of the correction processing. In the example of FIG. 16, the correction processing is performed using expression (5). Therefore, among the two pixels having different α values (n component values) (i.e., pixels P3 and P4), only the pixel having a smaller α value (only pixel P4) is the target of α value increase. When, for example, the correction processing is performed using expression (6) or (7), where the border is between the two pixels having different α values (pixels P3 and P4), the pixels located within the distance of two pixels from the border (pixel P4 and P5) are the target of α value increase.

Figure 17:
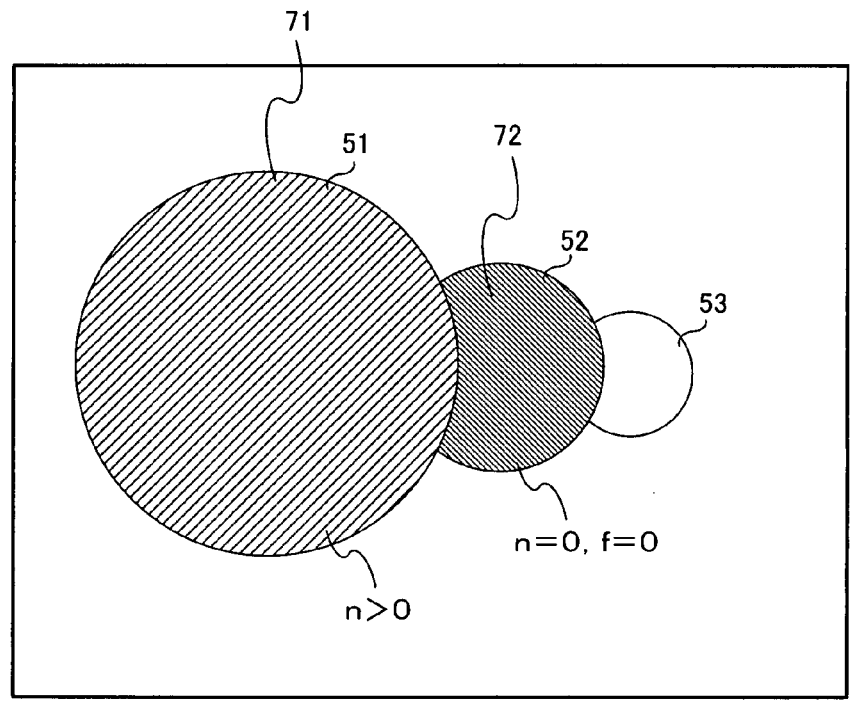
FIG. 17 shows a pre-correction distribution of a information set for each pixel of the reference image shown in FIG. 8.
Figure 18:
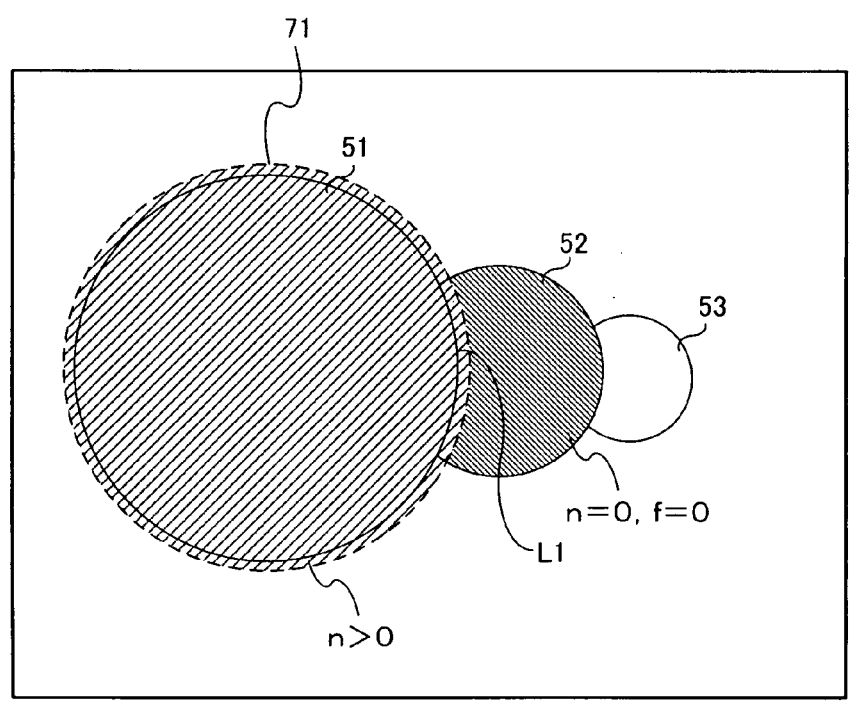
FIG. 18 shows a post-correction distribution of a information set for each pixel of the reference image shown in FIG. 8.

FIG. 17 shows a distribution of the pre-correction a information set for each pixel of the reference image shown in FIG. 8. FIG. 18 shows a distribution of the post-correction a information set for each pixel of the reference image shown in FIG. 8. In FIG. 17 and FIG. 18, the pixels in an area 71 have a positive n component value. In FIG. 17, the pixels in an area 72 have an n component value of 0 and also an f component value of 0. The pixels in an area other than the areas 71 and 72 have a positive f component value and an n component value of 0. In the reference image shown in FIG. 8, only the first object 51 is located closer to the viewpoint of the virtual camera than the focal length as described above. Therefore, in step S4, a two-dimensional vector in which the n component value is a positive value (a value which is not 0) is set for the pixels corresponding to the first object 51. Hence, as shown in FIG. 17, before the correction processing, the area 71 of the pixels having a positive n component value corresponds only to the first object 51. The area 72 of the pixels having an n component value of 0 and also an f component value of 0 corresponds to the second object 52 located at the focal length of the virtual camera.

By the correction processing in step S5, as shown in FIG. 16, the n component value of a pixel adjacent to the pixel having a positive n component value becomes a positive value. Therefore, as shown in FIG. 18, after the correction processing, the area 71 of the pixels having a positive n component value is enlarged as compared to before the correction processing. As the area 71 is enlarged, the area 72 of the pixels having an n component value of 0 and also an f component value of 0 is reduced. In other words, the pixels in the vicinity of the border L1 between the first object 51 and the second object 52 (at least the pixels adjacent to the border L1) are excluded from the area 72 and included in the area 71. In this manner, after the correction processing, a part of the pixel area corresponding to the second object 52, which is in the vicinity of the border L1, obtains a positive n component value. In the case where the constant G in expressions (5) through (8) is smaller than 1, the α value of the pixels in the vicinity of the border L1, among the pixels corresponding to the first object 51, may be decreased by the smoothing processing. In this case, the ratio of the blurred image in the synthesized image to be displayed (hereinafter, referred to as a "display image") may be reduced and as a result, the first object in the blurred image may appear smaller than that in the reference image. For this reason, the constant G is preferably equal to or greater than 1. For example, the constant is set as G=3 through 4.

Returning to FIG. 12, in step S6 after step S5, the CPU 10 calculates the α value of each pixel based on the α information set for the pixel. Specifically, the α value of each pixel is calculated based on the n component value and the f component value of the α information (two-dimensional vector) set for the pixel. More specifically, the CPU 10 refers to the corrected α information data 65 stored on the main memory to add together the n component value and the f component value represented by the corrected α information data 65. The resultant value is set as the α value. In this embodiment, at least one component value of the two-dimensional vector is 0. Therefore, the processing of adding the n component value and the f component value together to obtain the α value is the same as the processing of setting the larger value among the n component value and the f component value to be the α value. Data representing the α value of each pixel calculated in step S6 is stored on the main memory as the α value data 66.

By the processing in step S6, the final α value is set for each pixel. As a result, the α value of each pixel in the area 72 in FIG. 18 becomes 0. The α value of each pixel outside the area 72 in FIG. 18 becomes a value which is not 0. Thus, for the pixels in the vicinity of the border L1 between the first object 51 and the second object 52, the α value is set to a value which is not 0.

In step S7, the CPU 10 synthesizes the reference image and the blurred image based on the α value. Specifically, the CPU 10 refers to the reference image data 62, the blurred image data 63, and the α value data 66 to calculate a color value C of each pixel of the display image in accordance with the following expression (9).

$$C = C1 \times (1-\alpha) + C2 \times \alpha \quad (9)$$

In expression (9), variable C1 represents the color value of the reference image, and variable C2 represents the color value of the blurred image. The CPU 10 calculates the color value of each pixel of the display image using expression (9), so that data on the display image is obtained.

The pixels in the area 72 shown in FIG. 18 have an α value of 0. Therefore, the reference image is reflected as it is on the display image for this area. The pixels outside the area 72 have an α value which is not 0. Therefore, the blurred image is reflected on the display image for this area. In the vicinity of the border L1 between the first object 51 and the second object 52, the blurred image is reflected to generate the display image. As a result, the border L1 is shown as being blurred in the display image. In this manner, the display image in which the border L1 is blurred as shown in FIG. 10 is obtained.

In step S8, the CPU 10 draws the display image obtained in step S7. Namely, the CPU 10 writes the data on the display image obtained in step S7 onto the frame buffer included in the VRAM 11d. Thus, the display image is displayed on the TV 2.

In step S9, the CPU 10 determines whether or not to terminate the image generation processing. The determination is made in accordance with, for example, whether or not the player has made an instruction to terminate the play. Until it is determined that the image generation processing is to be terminated in step S9, the processing in steps S1 through S9 is repeated. When the determination result in step S9 is positive, the CPU 10 terminates the image generation processing shown in FIG. 12. The image generation processing is executed in this manner.

As described above, in this embodiment, an α value of each pixel of the reference image is first provisionally set, and then such a provisional α value is corrected (smoothed). By such an arrangement, an unfocused object (first object 51) is prevented from being shown with a clear outline in the border with a focused object (second object 52) (i.e., the image as shown in FIG. 10 is generated). In this manner, the game apparatus 3 can generate an image with more realistic focusing.

In this embodiment, the provisional α value (α information) is represented by a two-dimensional vector, so that the α value is corrected (step S5) for only pixels having a Z value smaller than the focal length. The α value is not corrected for the pixels having a Z value larger than the focal length. Therefore, as shown in FIG. 10, in the vicinity of the border L2 between the second object 52 and the third object 53, the second object 52 is shown with a clear outline. The blurred outline of the first object 51 located closer to the virtual camera than the second object 52 located at the focal length is represented as overlapping the second object 52, whereas the blurred outline of the third object 53 located deeper than the second object 52 does not overlap the second object 52. The object located closer than the reference object and the object deeper than the reference object can be naturally represented regarding the blurred outline, and thus a more realistic image can be generated.

(Modification Regarding the α Information (1))

Figure 19:
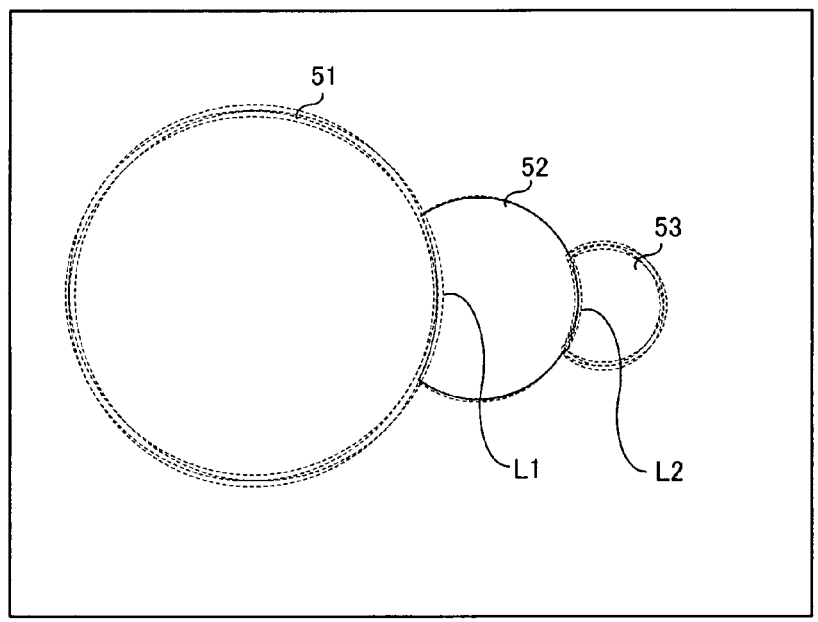
FIG. 19 shows a display image generated when correction processing is performed on all the pixels.

In other embodiments, the α information may not be represented by a two-dimensional vector and may be treated as one value (scalar value). Namely, in step S4, the α value calculated in accordance with the Z value may be used as the α information. In this case, the correction processing in step S5 is performed on all the pixels. According to this arrangement, the data amount of the α information can be reduced, and the processing of calculating the α value from the two-dimensional vector (step S6) is not necessary. As a result, the image generation processing can be simplified. FIG. 19 shows a display image generated when the correction processing is performed on all the pixels. As shown in FIG. 19, in the border L2 between the second object 52 and the third object 53, the blurred outline of the third object 53 is shown as overlapping the second object 52. When it is necessary to show the border L2 with a clear outline, the correction processing needs to be performed only on the pixels having a Z value smaller than the focal length.

(Modification Regarding the α Information (2))

Figure 20:
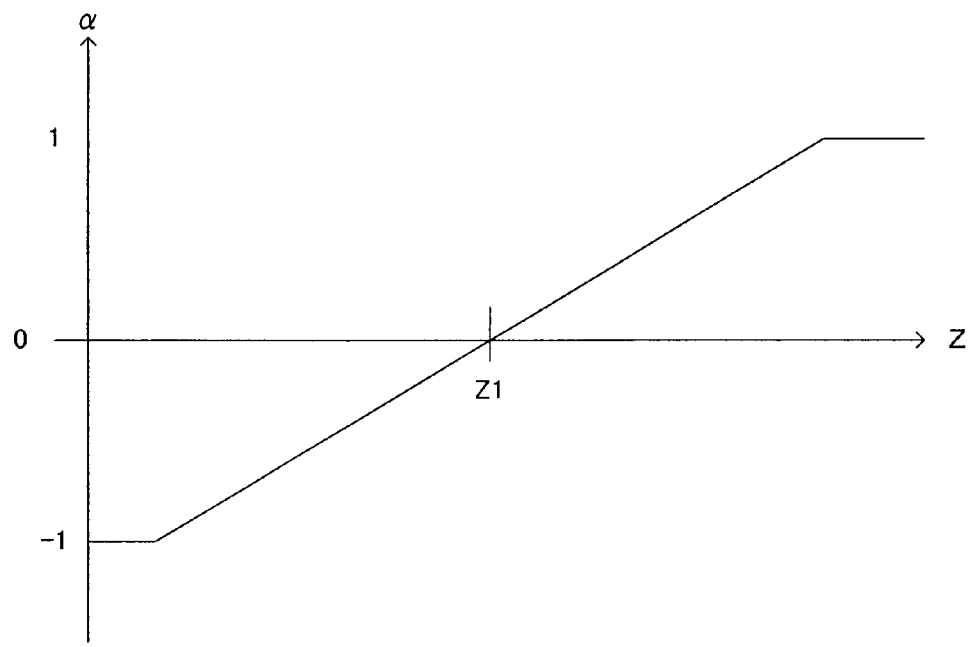
FIG. 20 shows the relationship between the Z value of a pixel and a information set for the pixel, which is used in a modification to the embodiment.

In other embodiments, an α value with a positive or negative sign may be used as the α information. FIG. 20 shows the relationship between the Z value of the pixel and the α information set for the pixel, which is used in this modification. In FIG. 20, the horizontal axis represents the Z value, and the vertical axis represents the α value. As shown in FIG. 20, when the Z value is equal to the focal length Z1, α=0. As a value obtained by subtracting the Z value from the focal length Z1 is larger, the α value is larger in the range of −1≦α≦1. According to this arrangement, the pixels having a Z value smaller than the focal length Z1 have a negative α value; whereas the pixels having a Z value larger than the focal length Z1 have a positive α value. Therefore, the case where the Z value is larger than the focal length Z1 is distinguishable from the case where the Z value is smaller than the focal length Z1. When an α value with a positive or negative sign is used as the α information, the CPU 10 performs the correction processing in step S5 only on the pixels having a negative α value. In step S6, the absolute value of the α value is calculated as a final α value. In this case, the game apparatus 3 can generate substantially the same display image as that in the above-described embodiment (FIG. 10). In this modification, it is necessary to extract pixels having a negative α value in step S5. The processing in step S5 is simpler when the two-dimensional vector is used.

(Modification Regarding the α Information (3))

In the above embodiment, the two-dimensional vector is used as the α information, and such a two-dimensional vector is set such as at least one of the components is 0 (step S4). Specifically, when the Z value is larger than the focal length Z1, the n component value is set to 0 and the f component value is set to the α value. In other embodiments, even when the Z value is larger than the focal length Z1, the n component value may be set to a predetermined value which is not 0 (the f component value is set to the α value). In this case, in step S5, the CPU 10 performs the correction processing on the pixels having an n component value which is not 0 as well as the pixels having a Z value smaller than the focal length Z1. According to such an arrangement, the designer can easily designate the pixels to be the targets of the correction processing. For example, in the case where the predetermined value is set to α value in accordance with the f component value (e.g., α value of x % of the f component value), the border L2 between the second object 52 and the third object 53 can be shown as being slightly blurred. Alternatively, for the pixels having a Z value smaller than a predetermined value (which may be a value larger than the focal length Z1) the n component value may be set to the α value. The two-dimensional vector may be used as the α information in this manner, so that the pixels to be corrected can be easily designated.

(Modification Regarding the Correction Processing)

Figure 21:
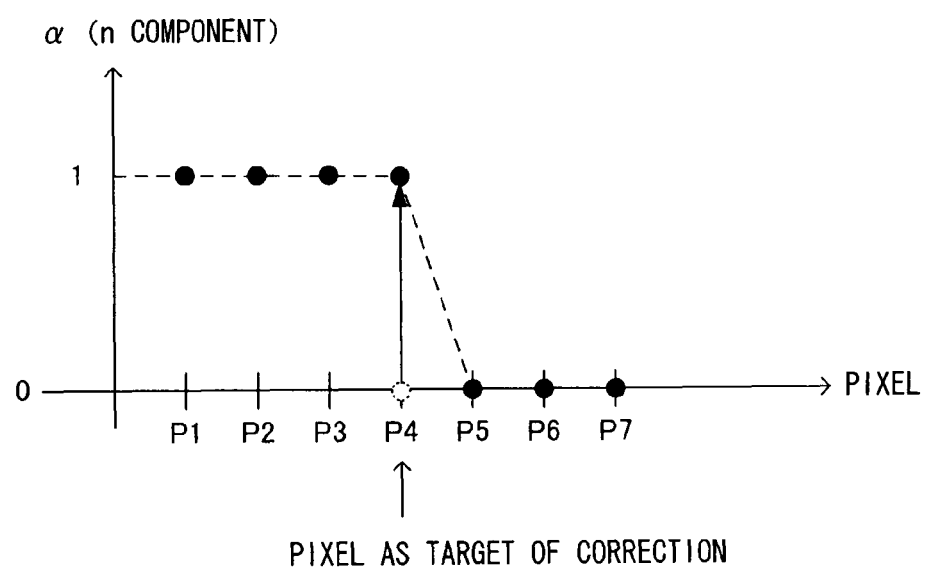
FIG. 21 illustrates a modification to the embodiment regarding the correction processing.

In the above embodiment, the CPU 10 corrects the α value by smoothing the n component value of each pixel in step S5. The method of the correction processing in step S5 is not limited to smoothing. As long as the α value is increased for the pixel having a smaller α value among two adjacent pixels which have an α value difference of a predetermined value or greater, any method is usable. FIG. 21 shows a modification regarding the correction processing. As the correction processing, the CPU 10 may execute the processing shown in FIG. 21 instead of the processing shown in FIG. 16. Specifically, for pixel P4 having a smaller α value among the two adjacent pixels P3 and P4 which have an α value difference of a predetermined value or greater, the CPU 10 may increase the α value (specifically, the CPU 10 may equalize the α value of pixel P4 to the α value of pixel P3). The CPU 10 may additionally increase the α value of pixel P5 adjacent to pixel P4. In this manner also, substantially the same display image as that in the above embodiment (FIG. 10) can be generated.

Specifically, in step S5, the CPU 10 first selects pixels to be the target of correction from the pixels of the reference images. For example, the CPU 10 selects pixels fulfilling the conditions that the α value of the pixel is smaller than either one of the adjacent pixels and that the α value difference is a predetermined value or greater. In addition to the above conditions, another condition that the α value is equal to or smaller than a predetermined value may be added. In other embodiments, the conditions may be that the α value of the pixel is smaller than either one of the adjacent pixels and is equal to or smaller than a predetermined manner. Then, the CPU 10 performs the correction processing such that the α value of each pixel selected as the target of correction is increased. Specifically, the CPU 10 may correct the α value by adding a predetermined constant to the pre-correction value, or by equalizing the pre-correction value to the α value of the adjacent pixel.

(Modification Regarding the Flow of the Image Generation Processing)

Figure 22:
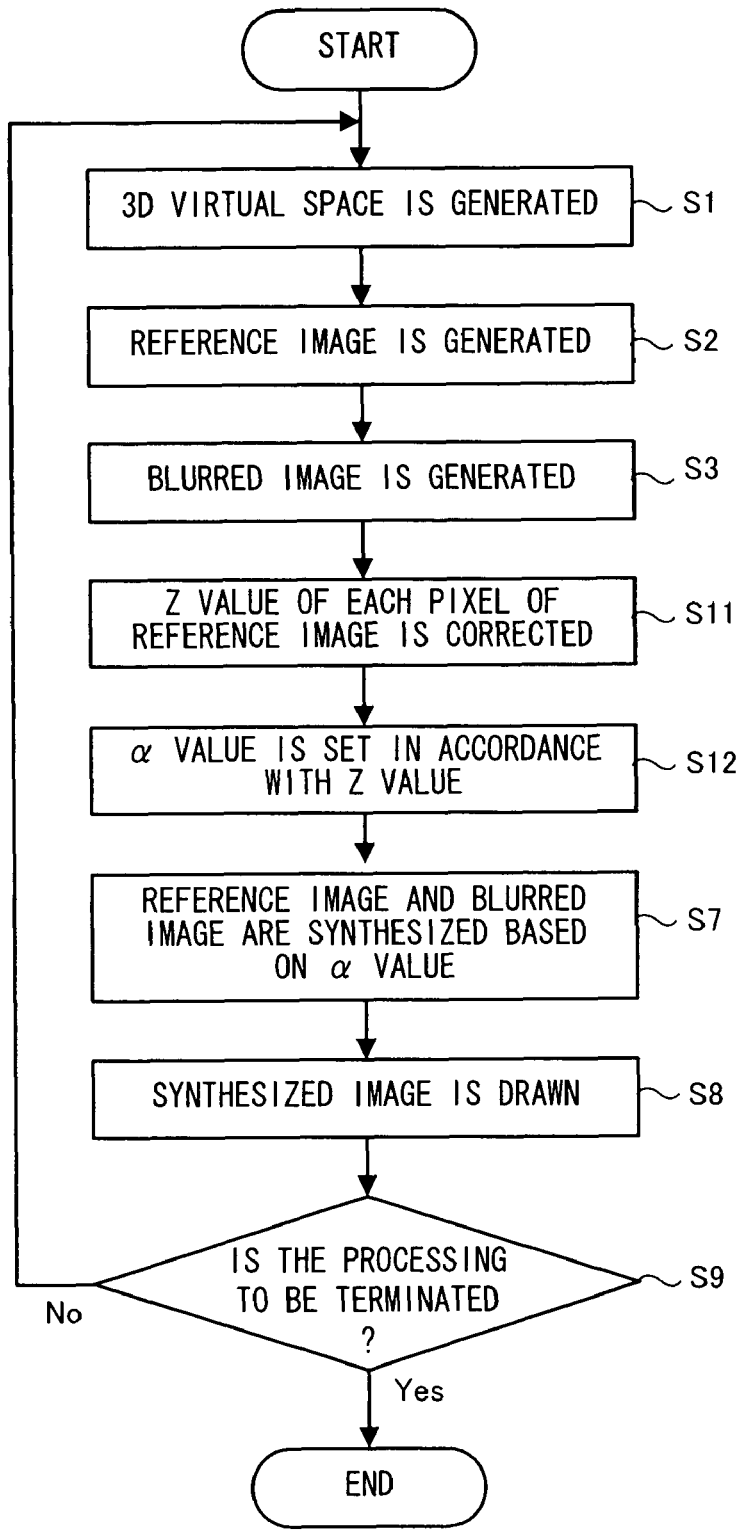
FIG. 22 is a flowchart illustrating a flow of image generation processing in a modification to the embodiment.

In the above embodiment, the game apparatus 3 provisionally sets the α value in accordance with the Z value set for each pixel of the reference image, and corrects the provisional α value to obtain the final α value. In other embodiments, the Z value set for each pixel of the reference image may be corrected and an α value in accordance with the corrected Z value may be calculated. FIG. 22 is a flowchart illustrating a flow of the image generation processing in a modification to the above-described embodiment. In FIG. 22, the same steps as those in FIG. 12 bear the same reference numerals and detailed descriptions thereof will be omitted.

In the modification shown in FIG. 22, in step S11 after step S3, the CPU 10 corrects the Z value set for each pixel of the reference image. By the correction processing in step S11, among two adjacent pixels which have a Z value difference of a predetermined value or greater, the pixel having a Z value closer to the focal length Z1 is corrected such that the Z value thereof becomes closer to the Z value of the other pixel.

According to one specific method for this correction processing, the Z value of each pixel is smoothed. In the case where the smoothing processing is performed only on the pixels having a Z value equal to or smaller than the focal length, substantially the same display image as that in the above embodiment (FIG. 10) can be generated. Specifically, the CPU 10 may set a two-dimensional vector as follows. For the pixels having a Z value equal to or smaller than the focal length, a two-dimensional vector in which a first component value is the Z value and a second component value is 0 is set; and for the pixels having a Z value larger than the focal length, a two-dimensional vector in which the first component value is 0 and the second component value is the Z value is set. The CPU 10 performs the smoothing processing on the first component of the calculated two-dimensional vector, and adds the first component value and the second component value of the post-smoothing two-dimensional vector. Thus, the post-correction Z value is obtained.

According to another specific method for this correction processing, pixels as the target of correction are selected from the pixels of the reference image, and the Z value of each selected pixel is corrected. Specifically, the CPU 10 selects pixels having a Z value which is within a predetermined range including the focal length (e.g., a Z value which is different from the focal length by a value within a predetermined range) and is different from the Z value of an adjacent pixel by a predetermined value or greater. The CPU 10 then, for example, increases the Z value of each selected pixel by a predetermined value, or equalizes the Z value of each selected pixel to the Z value of the adjacent pixel. Thus, the post-correction Z value is obtained.

In step S12 after step S11, the CPU 10 sets the α value of each pixel in accordance with the Z value obtained in step S11. Specifically, when the Z value is equal to the focal length, the α value is set as α=0. As the difference between the Z value and the focal length is larger, the α value is larger with the maximum being α=1. After step S12, the processing in steps S7 through S9 is executed. In this modification also, substantially the same display image as in the above embodiment (FIG. 10) can be generated.

In the above embodiment, the image generation processing for generating a focused image is performed during the game processing executed by the game apparatus 3. The present invention is not limited to being used for a game. The present invention is applicable to various image processing apparatuses for generating an image of a three-dimensional space.

Certain example embodiments may relate to and be usable for, for example, game apparatuses, programs and the like in order to generate a focused image more realistically.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored thereon an image processing program to be executed by a computer of an image processing apparatus for generating an image, the image processing program configured to cause the computer to:
   set an α value of each pixel of a reference image having a depth value, the α value being set in accordance with the depth value of the respective pixel;
   increase the α value for a pixel having a smaller α value among two adjacent pixels each having a depth value equal to or smaller than a reference value, the reference value being based on a focal length of a virtual camera;
   assign the α value of the pixel to a first parameter value when the depth value of the pixel is smaller than the reference value;
   assign the α value of the pixel to a second parameter value when the depth value of the pixel is larger than the reference value;
   determine the α value of the pixel based on the first parameter value and the second parameter value; and
   synthesize the reference image and a blurred image corresponding to the reference image based on the α value after determining the α value of the pixel based on the first parameter value and the second parameter value.

2. A non-transitory computer-readable storage medium according to claim 1, wherein the increase is performed only where the two adjacent pixels have an α value difference of a predetermined value or greater.

3. A non-transitory computer-readable storage medium according to claim 1, wherein the α value is set such that the α value is smaller for a pixel having a depth value closer to the reference value.

4. A non-transitory computer-readable storage medium having stored thereon an image processing program to be executed by a computer of an image processing apparatus for generating an image, the image processing program configured to cause the computer to:
   set an α value of each pixel of a reference image having a depth value, the α value being set in accordance with the depth value of the respective pixel;
   increase the α value for a pixel having a smaller α value among two adjacent pixels each having a depth value equal to or smaller than a reference value, the reference value being based on a focal length of a virtual camera;
   assign the α value of the pixel to a first component value when the depth value of the pixel is smaller than the reference value or assign the α value of the pixel to a second component value when the depth value of the pixel is larger than the reference value;
   determine the α value of the pixel based on the first component value and the second component value; and
   synthesize the reference image and a blurred image corresponding to the reference image based on the α value after determining the α value of the pixel based on the first component value and the second component value, wherein the first parameter value and the second parameter value are components of a two-dimensional vector and the image processing program is further configured to cause the computer to:
   smooth a value of the first component of the two-dimensional vector;
   set a sum of the first component value and the second component value of the two-dimensional vector as the α value for each pixel; and
   synthesize the reference image and the blurred image after setting the sum.

5. A non-transitory computer-readable storage medium according to claim 4, the image processing program further configured to cause the computer to set 0 as the second component value of the two-dimensional vector for a pixel having a depth value smaller than the reference value, and set 0 as the first component value of the two-dimensional vector for a pixel having a depth value larger than the reference value.

6. A non-transitory computer-readable storage medium according to claim 1, the image processing program further configured to cause the computer to smooth the α value.

7. A non-transitory computer-readable storage medium according to claim 1, the image processing program further configured to cause the computer to:
   select a pixel having an α value which is smaller than the α value of an adjacent pixel and is different from the α value of the adjacent pixel by a predetermined value or greater; and
   increase the α value of the selected pixel.

8. A non-transitory computer-readable storage medium according to claim 1, the image processing program further configured to cause the computer to:
   select a pixel having an α value which is smaller than the α value of an adjacent pixel and is equal to or smaller than a predetermined value; and
   increase the α value of the selected pixel.

9. A non-transitory computer-readable storage medium according to claim 1, the image processing program further configured to cause the computer to generate the blurred image by smoothing a color value of each pixel of the reference image.

10. A non-transitory computer-readable storage medium having stored thereon an image processing program to be executed by a computer of an image processing apparatus for generating an image, the image processing program configured to cause the computer to:
   correct a pixel having a depth value closer to a predetermined reference value among two adjacent pixels of a reference image having a depth value for each pixel, the depth value for each pixel being smaller than or equal to the predetermined reference value, the pixel being corrected such that the depth value thereof becomes closer to the depth value of the other pixel;
   set an α value of each pixel in accordance with the depth value of the respective pixel;
   assign the α value of the pixel to a first component value when the depth value of the pixel is smaller than the reference value;

assign the α value of the pixel to a second component value when the depth value of the pixel is larger than the reference value;

determine the α value of the pixel based on the first component value and the second component value; and synthesize the reference image and a blurred image corresponding to the reference image based on the α value after the α value of the pixel is determined based on the first component value and the second component value, wherein the predetermined reference value is derived from a focal length of a virtual camera.

11. A non-transitory computer-readable storage medium according to claim 10, wherein the correction of the pixel is performed only where the two adjacent pixels have a depth value difference of greater than a predetermined threshold.

12. A non-transitory computer-readable storage medium according to claim 10, wherein the image processing program is further configured to cause the computer to set the α value such that the α value is smaller for a pixel having a depth value closer to the predetermined reference value.

13. A non-transitory computer-readable storage medium according to claim 10, wherein the correction of the pixel is only when the pixel has a depth value which is equal to or smaller than the predetermined reference value.

14. An image processing apparatus for generating an image, comprising:
a processing system configured to:
set an α value of a pixel of a reference image, the pixel having a depth value, the α value being set in accordance with the depth value;
increase the α value of the pixel when the α value is smaller than an adjacent α value of an adjacent pixel, both the pixel and the adjacent pixel each having a depth value equal to or smaller than a reference value;
assign the α value of the pixel to a first parameter value when the depth value of the pixel is smaller than the reference value;
assign the α value of the pixel to a second parameter value when the depth value of the pixel is larger than the reference value;
determine the α value of the pixel based on the first parameter value and the second parameter value; and
synthesize the reference image and a blurred image corresponding to the reference image based on the α value after the α value of the pixel is determined based on the first parameter value and the second parameter component value,
wherein the reference value is based on a focal length of a virtual camera controlled by the processing system.

15. An image processing apparatus for generating an image, comprising:
a processing system configured to:
calculate a predetermined reference value based on a focal length of a virtual camera;
correct a pixel having a depth value closer to the predetermined reference value among two adjacent pixels of a reference image having a depth value for each pixel, the depth value for each pixel being smaller than or equal to the predetermined reference value, the pixel being corrected such that the depth value thereof becomes closer to the depth value of the other pixel;
set an α value of each pixel in accordance with the depth value of the respective pixel after being corrected;
assign the α value of the pixel to a first parameter value when the depth value of the pixel is smaller than the reference value;
assign the α value of the pixel to a second parameter value when the depth value of the pixel is larger than the reference value;
determine the α value of the pixel based on the first parameter value and the second parameter value; and
synthesize the reference image and a blurred image corresponding to the reference image based on the α value of the pixel after the α value of the pixel is determined based on the first parameter value and the second parameter value.

16. A computer implemented method for generating an image on an image processing apparatus, the method comprising:
calculating a reference value from a focal length of a virtual camera;
setting an α value of each pixel of a reference image having a depth value for each pixel, the α value being set in accordance with the depth value of the respective pixel;
increasing the α value which is set for a pixel having a smaller α value among two adjacent pixels each having a depth value equal to or smaller than the reference value;
assigning the α value of the pixel to a first component value when the depth value of the pixel is smaller than the reference value;
assigning the α value of the pixel to a second component value when the depth value of the pixel is larger than the reference value;
determining the α value of the pixel based on the first component value and the second component value; and
synthesizing the reference image and a blurred image corresponding to the reference image based on the α value for the pixel after the α value of the pixel is determined based on the first component value and the second component value.

17. A computer implemented method for generating an image on an image processing apparatus, the method comprising:
correcting a pixel having a depth value closer to a predetermined reference value among two adjacent pixels of a reference image having a depth value for each pixel, the depth value for each pixel being smaller than or equal to the predetermined reference value, the pixel being corrected such that the depth value thereof becomes closer to the depth value of the other pixel;
setting an α value of each pixel in accordance with the depth value of the respective pixel;
assigning the α value of the pixel to a first component value when the depth value of the pixel is smaller than the reference value;
assigning the α value of the pixel to a second component value when the depth value of the pixel is larger than the reference value;
determining the α value of the pixel based on the first component value and the second component value; and
synthesizing the reference image and a blurred image corresponding to the reference image based on the α value for the pixel after the α value of the pixel is determined based on the first component value and the second component value,
wherein the predetermined reference value is based on a focal length of a virtual camera.

18. An image processing system for generating an image, comprising:
a processing system configured to:
set an α value of each pixel of a reference image having a depth value, the α value being set in accordance with the depth value of a respective pixel;
increase the α value of a pixel which has a smaller α value among two adjacent pixels each having a depth value equal to or smaller than a reference value, wherein the reference value is based on a focal length of a virtual camera;
assign the α value of the pixel to a first component value when the depth value of the pixel is smaller than the reference value;
assign the α value of the pixel to a second component value when the depth value of the pixel is larger than the reference value;
determine the α value of the pixel based on the first component value and the second component value; and
synthesize the reference image and a blurred image corresponding to the reference image based on the determined α value for the pixel after the α value of the pixel is determined based on the first component value and the second component value.

19. An image processing apparatus for generating an image, comprising:
a processing system configured to:
derive a predetermined depth value from a focal length of a virtual camera;
correct a pixel having a depth value closer to the predetermined depth value among two adjacent pixels of a reference image that has a depth value for each pixel, the depth value for each pixel being smaller than or equal to the predetermined depth value, the pixel being corrected such that the depth value thereof becomes closer to the depth value of the other pixel;
set an α value of each pixel in accordance with the depth value of the respective pixel after being corrected;
assign the α value of the pixel to a first component value when the depth value of the pixel is smaller than the reference value;
assign the α value of the pixel to a second component value when the depth value of the pixel is larger than the reference value;
determine the α value of the pixel based on the first component value and the second component value; and
synthesize the reference image and a blurred image corresponding to the reference image based on the α value of the pixel after the α value of the pixel is determined based on the first component value and the second component value.

20. The apparatus of claim 14, where the processing system is further configured to smooth the α value of a pixel that has a depth value that is smaller than the reference value.

21. An image processing system for generating an image, comprising:
processing system configured to:
set an α value of each pixel of a reference image having a depth value, the α value being set in accordance with the depth value of a respective pixel;
increase the α value of a pixel which has a smaller α value among two adjacent pixels each having a depth value equal to or smaller than a reference value, wherein the reference value is based on a focal length of a virtual camera;
assign the α value of the pixel to a first component value when the depth value of the pixel is smaller than the reference value or assign the α value of the pixel to a second component value when the depth value of the pixel is larger than the reference value;
determine the α value of the pixel based on the first component value and the second component value; and
synthesize the reference image and a blurred image corresponding to the reference image based on the determined α value for the pixel after the α value of the pixel is determined based on the first component value and the second component value, wherein the processing system is further configured to:
smooth the first component value; and
set a sum of the first component value and the second component value as the α value of the pixel.

* * * * *